(12) United States Patent
Kamitani et al.

(10) Patent No.: US 11,174,539 B2
(45) Date of Patent: *Nov. 16, 2021

(54) STEEL MATERIAL SUITABLE FOR USE IN SOUR ENVIRONMENT

(71) Applicant: NIPPON STEEL CORPORATION, Tokyo (JP)

(72) Inventors: Hiroki Kamitani, Tokyo (JP); Atsushi Soma, Tokyo (JP); Shinji Yoshida, Tokyo (JP); Yuji Arai, Tokyo (JP); Seiya Okada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/980,671

(22) PCT Filed: Mar. 25, 2019

(86) PCT No.: PCT/JP2019/012304
§ 371 (c)(1),
(2) Date: Sep. 14, 2020

(87) PCT Pub. No.: WO2019/188869
PCT Pub. Date: Oct. 3, 2019

(65) Prior Publication Data
US 2021/0017635 A1    Jan. 21, 2021

(30) Foreign Application Priority Data

Mar. 27, 2018 (JP) .............................. JP2018-060010
Apr. 3, 2018 (JP) .............................. JP2018-071300

(51) Int. Cl.
*C22C 38/00* (2006.01)
*C22C 38/54* (2006.01)
(Continued)

(52) U.S. Cl.
CPC ............ *C22C 38/54* (2013.01); *C22C 38/001* (2013.01); *C22C 38/002* (2013.01);
(Continued)

(58) Field of Classification Search
CPC ... C22C 38/001; C22C 38/002; C22C 38/005; C22C 38/02; C22C 38/04; C22C 38/06;
(Continued)

(56) References Cited

U.S. PATENT DOCUMENTS

2006/0018783 A1* 1/2006 Itou ........................ C22C 38/04
420/84
2007/0137736 A1    6/2007 Omura et al.
(Continued)

FOREIGN PATENT DOCUMENTS

JP    59232220 A    12/1984
JP    62253720 A    11/1987
(Continued)

*Primary Examiner* — Humera N. Sheikh
*Assistant Examiner* — John D Schneible
(74) *Attorney, Agent, or Firm* — Greer, Burns & Crain, Ltd.

(57) ABSTRACT

The steel material according to the present disclosure contains a chemical composition consisting of, in mass %, C: 0.20 to 0.50%, Si: 0.05 to 0.50%, Mn: 0.05 to 1.00%, P: 0.030% or less, S: 0.0100% or less, Al: 0.005 to 0.100%, Cr: 0.10 to 1.50%, Mo: 0.25 to 1.50%, Ti: 0.002 to 0.050%, N: 0.0100% or less and O: 0.0100% or less, with the balance being Fe and impurities. The steel material contains an amount of dissolved C within a range of 0.010 to 0.050 mass %. The steel material also has a yield strength within a range of 655 to less than 862 MPa, and a yield ratio of the steel material is 85% or more.

10 Claims, 2 Drawing Sheets

(51) Int. Cl.
*C22C 38/02* (2006.01)
*C22C 38/04* (2006.01)
*C22C 38/06* (2006.01)
*C22C 38/22* (2006.01)
*C22C 38/42* (2006.01)
*C22C 38/46* (2006.01)
*C22C 38/48* (2006.01)
*C22C 38/50* (2006.01)
*C22C 38/52* (2006.01)

(52) U.S. Cl.
CPC ............ *C22C 38/005* (2013.01); *C22C 38/02* (2013.01); *C22C 38/04* (2013.01); *C22C 38/06* (2013.01); *C22C 38/22* (2013.01); *C22C 38/42* (2013.01); *C22C 38/46* (2013.01); *C22C 38/48* (2013.01); *C22C 38/50* (2013.01); *C22C 38/52* (2013.01)

(58) Field of Classification Search
CPC ......... C22C 38/22; C22C 38/42; C22C 38/46; C22C 38/48; C22C 38/50; C22C 38/52; C22C 38/54
USPC .......................................................... 428/544
See application file for complete search history.

(56) References Cited

U.S. PATENT DOCUMENTS

| | | | |
|---|---|---|---|
| 2011/0315276 A1 | 12/2011 | Bosch et al. | |
| 2014/0352836 A1* | 12/2014 | Eguchi | C21D 8/105 138/177 |
| 2015/0041030 A1* | 2/2015 | Kondo | C22C 38/02 148/663 |
| 2015/0114527 A1* | 4/2015 | Omura | C21D 8/005 148/621 |
| 2017/0081746 A1* | 3/2017 | Soma | C21D 9/08 |
| 2019/0063641 A1* | 2/2019 | Arai | C21D 6/008 |
| 2019/0226063 A1 | 7/2019 | Arai et al. | |
| 2020/0040436 A1* | 2/2020 | Arai | C22C 38/06 |

FOREIGN PATENT DOCUMENTS

| | | |
|---|---|---|
| JP | 63022478 A | 11/1994 |
| JP | 08311551 A | 11/1996 |
| JP | 10280037 A | 10/1998 |
| JP | 2000256783 A | 9/2000 |
| JP | 2000297344 A | 10/2000 |
| JP | 2012026030 A | 2/2012 |
| JP | 2013227611 A | 11/2013 |
| JP | 2014129594 A | 7/2014 |
| WO | 2018043570 A1 | 3/2018 |

* cited by examiner

STEEL MATERIAL SUITABLE FOR USE IN SOUR ENVIRONMENT

This is a National Phase Application filed under 35 U.S.C. § 371, of International Application No. PCT/JP2019/012304, filed Mar. 25, 2019, the contents of which are incorporated by reference.

TECHNICAL FIELD

The present invention relates to a steel material, and more particularly relates to a steel material suitable for use in a sour environment.

BACKGROUND ART

Due to the deepening of oil wells and gas wells (hereunder, oil wells and gas wells are collectively referred to as "oil wells"), there is a demand to enhance the strength of oil-well steel materials represented by oil-well steel pipes. Specifically, for example, 80 ksi grade (yield strength is 80 to less than 95 ksi, that is, 552 to less than 655 MPa) and 95 ksi grade (yield strength is 95 to less than 110 ksi, that is, 655 to less than 758 MPa) oil-well steel pipes are being widely utilized, and recently requests are also starting to be made for 110 ksi grade (yield strength is 110 to less than 125 ksi, that is, 758 to less than 862 MPa) oil-well steel pipes.

Most deep wells are in a sour environment containing corrosive hydrogen sulfide. In the present description, the term "sour environment" means an acidified environment containing hydrogen sulfide. Note that, in some cases a sour environment may also contain carbon dioxide. Oil-well steel pipes for use in such sour environments are required to have not only high strength, but to also have sulfide stress cracking resistance (hereunder, referred to as "SSC resistance").

Technology for enhancing the SSC resistance of steel materials as typified by oil-well steel pipes is disclosed in Japanese Patent Application Publication No. 62-253720 (Patent Literature 1), Japanese Patent Application Publication No. 59-232220 (Patent Literature 2) Japanese Patent Application Publication No. 6-322478 (Patent Literature 3), Japanese Patent Application Publication No. 8-311551 (Patent Literature 4), Japanese Patent Application Publication No. 2000-256783 (Patent Literature 5), Japanese Patent Application Publication No. 2000-297344 (Patent Literature 6), Japanese Patent Application Publication No. 2005-350754 (Patent Literature 7), National Publication of International Patent Application No. 2012-519238 (Patent Literature 8) and Japanese Patent Application Publication No. 2012-26030 (Patent Literature 9).

Patent Literature 1 proposes a method for improving the SSC resistance of steel for oil wells by reducing impurities such as Mn and P. Patent Literature 2 proposes a method for improving the SSC resistance of steel by performing quenching twice to refine the grains.

Patent Literature 3 proposes a method for improving the SSC resistance of a 125 ksi grade steel material by refining the steel microstructure by a heat treatment using induction heating. Patent Literature 4 proposes a method for improving the SSC resistance of steel pipes of 110 to 140 ksi grade by enhancing the hardenability of the steel by utilizing a direct quenching process and also increasing the tempering temperature.

Patent Literature 5 and Patent Literature 6 each propose a method for improving the SSC resistance of a steel for low-alloy oil country tubular goods of 110 to 140 ksi grade by controlling the shapes of carbides. Patent Literature 7 proposes a method for improving the SSC resistance of steel material of 125 ksi grade or higher by controlling the dislocation density and the hydrogen diffusion coefficient to desired values. Patent Literature 8 proposes a method for improving the SSC resistance of steel of 125 ksi grade by subjecting a low-alloy steel containing 0.3 to 0.5% of C to quenching multiple times. Patent Literature 9 proposes a method for controlling the shapes or number of carbides by employing a tempering process composed of a two-stage heat treatment. More specifically, in Patent Literature 9, a method is proposed that enhances the SSC resistance of 125 ksi grade steel by suppressing the number density of large $M_3C$ particles or $M_2C$ particles.

CITATION LIST

Patent Literature

Patent Literature 1: Japanese Patent Application Publication No. 62-253720
Patent Literature 2: Japanese Patent Application Publication No. 59-232220
Patent Literature 3: Japanese Patent Application Publication No. 6-322478
Patent Literature 4: Japanese Patent Application Publication No. 8-311551
Patent Literature 5: Japanese Patent Application Publication No. 2000-256783
Patent Literature 6: Japanese Patent Application Publication No. 2000-297344
Patent Literature 7: Japanese Patent Application Publication No. 2005-350754
Patent Literature 8: National Publication of International Patent Application No. 2012-519238
Patent Literature 9: Japanese Patent Application Publication No. 2012-26030

SUMMARY OF INVENTION

Technical Problem

As described above, accompanying the increasing severity of oil well environments in recent years, there is a demand for oil-well steel pipes that are more excellent in SSC resistance than the conventional oil-well steel pipes. Therefore, steel materials (for example, oil-well steel pipes) having a yield strength of 95 ksi grade or 110 ksi grade (655 to less than 862 MPa) and excellent SSC resistance may be obtained by using techniques other than the techniques disclosed in the aforementioned Patent Literatures 1 to 9.

An objective of the present disclosure is to provide a steel material that has a yield strength within a range of 655 to less than 862 MPa (95 to less than 125 ksi; 95 ksi grade or 110 ksi grade) and that also has excellent SSC resistance.

Solution to Problem

A steel material according to the present disclosure contains a chemical composition consisting of, in mass %, C: 0.20 to 0.50%, Si: 0.05 to 0.50%, Mn: 0.05 to 1.00%, P: 0.030% or less, S: 0.0100% or less, Al: 0.005 to 0.100%, Cr: 0.10 to 1.50%, Mo: 0.25 to 1.50%, Ti: 0.002 to 0.050%, N: 0.0100% or less, O: 0.0100% or less, B: 0 to 0.0050%, V: 0 to 0.30%, Nb: 0 to 0.100%, Ca: 0 to 0.0100%, Mg: 0 to 0.0100%, Zr: 0 to 0.0100%, rare earth metal: 0 to 0.0100%, Co: 0 to 0.50%, W: 0 to 0.50%. Ni: 0 to 0.50% and Cu: 0 to 0.50%, with the balance being Fe and impurities. The steel material according to the present disclosure also contains an amount of dissolved C within a range of 0.010 to 0.050 mass %. The steel material according to the present disclosure also has a yield strength within a range of 655 to less than 862 MPa, and a yield ratio of the steel material is 85% or more.

Advantageous Effects of Invention

The steel material according to the present disclosure has a yield strength within a range of 655 to less than 862 MPa (95 ksi grade or 110 ksi grade), and also has excellent SSC resistance.

DESCRIPTION OF EMBODIMENTS

Figure 1A:
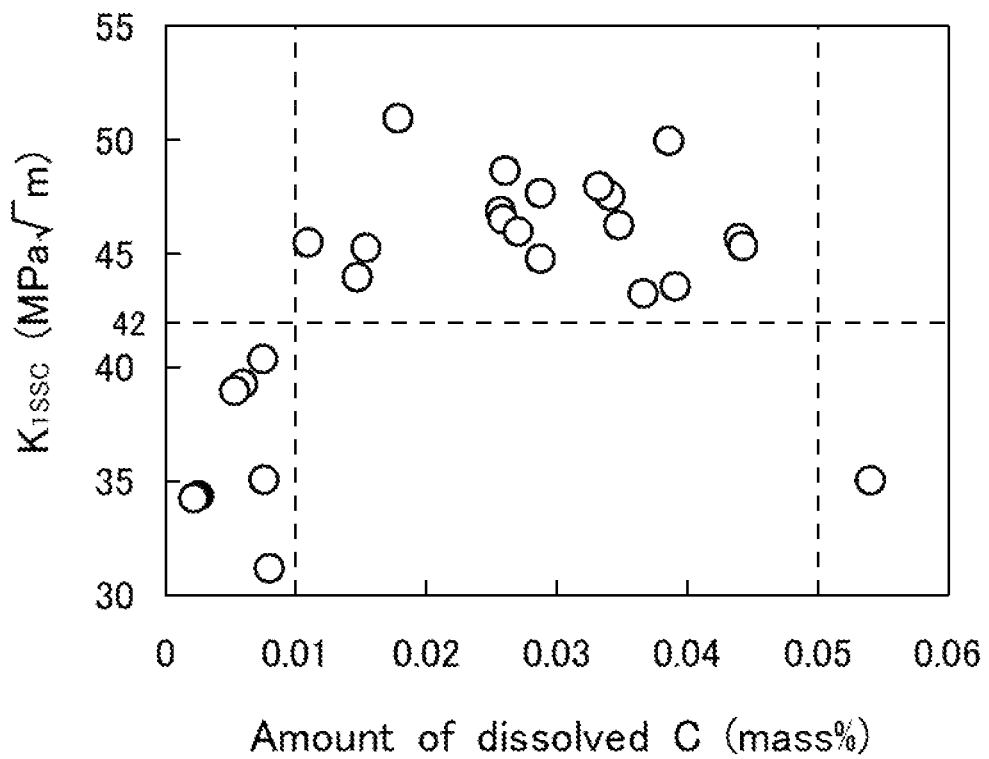
FIG. 1A is a view illustrating the relation between the amount of dissolved C and a fracture toughness value $K_{ISSC}$ for respective test numbers having a yield strength of 95 ksi grade in the examples.

The present inventors conducted investigations and studies regarding a method for obtaining both a yield strength in a range of 655 to less than 862 MPa (95 ksi grade or 110 ksi grade) and excellent SSC resistance in a steel material that it is assumed will be used in a sour environment, and obtained the following findings.

If the dislocation density in the steel material is increased, the yield strength of the steel material will increase. On the other hand, there is a possibility that dislocations will occlude hydrogen. Therefore, if the dislocation density of the steel material increases, there is a possibility that the amount of hydrogen that the steel material occludes will also increase. If the hydrogen concentration in the steel material increases as a result of increasing the dislocation density, even if high strength is obtained, the SSC resistance of the steel material will decrease. Accordingly, at first glance it seems that, in order to obtain both a yield strength of 95 ksi or more and SSC resistance, utilizing the dislocation density to enhance the strength is not preferable.

However, the present inventors discovered that by adjusting the amount of dissolved C in a steel material, excellent SSC resistance can also be obtained while at the same time adjusting the yield strength to 95 ksi or more by utilizing the dislocation density. Although the reason is not certain, it is considered that the reason may be as follows.

Dislocations include mobile dislocations and sessile dislocations, and it is considered that dissolved C in a steel material immobilizes mobile dislocations to thereby form sessile dislocations. When mobile dislocations are immobilized by dissolved C, the disappearance of dislocations can be inhibited, and thus a decrease in the dislocation density can be suppressed. In this case, the yield strength of the steel material can be maintained.

In addition, it is considered that the sessile dislocations that are formed by dissolved C reduce the amount of hydrogen that is occluded in the steel material more than mobile dislocations. Therefore, it is considered that by increasing the density of sessile dislocations that are formed by dissolved C, the amount of hydrogen that is occluded in the steel material is reduced. As a result, the SSC resistance of the steel material can be increased. It is considered that because of this mechanism, excellent SSC resistance is obtained even when the steel material has the yield strength of 95 ksi or more.

As described above, the present inventors considered that by appropriately adjusting the amount of dissolved C in a steel material, the SSC resistance of the steel material can be increased while maintaining a yield strength of 95 ksi or more. Therefore, using a steel material containing chemical composition consisting of, in mass %, C: 0.20 to 0.50%, Si: 0.05 to 0.50%, Mn: 0.05 to 1.00%, P: 0.030% or less, S: 0.0100% or less, Al: 0.005 to 0.100%, Cr: 0.10 to 1.50%, Mo: 0.25 to 1.50%, Ti: 0.002 to 0.050%, N: 0.0100% or less, O: 0.0100% or less, B: 0 to 0.0050%, V: 0 to 0.30%, Nb: 0 to 0.100%, Ca: 0 to 0.0100%, Mg: 0 to 0.0100%, Zr: 0 to 0.0100%, rare earth metal: 0 to 0.0100%, Co: 0 to 0.50%, W: 0 to 0.50%, Ni: 0 to 0.50% and Cu: 0 to 0.50%, with the balance being Fe and impurities, the present inventors investigated the relation between the amount of dissolved C, the yield strength, and a fracture toughness value $K_{ISSC}$ that is an index of SSC resistance.

[Relation Between Amount of Dissolved C and SSC Resistance]

The present inventors first conducted detailed studies regarding the relation between the amount of dissolved C and SSC resistance of a steel material having a yield strength of 95 ksi grade (655 to less than 758 MPa). Specifically, with reference to the figures, the relation between the amount of dissolved C and SSC resistance of the steel material containing aforementioned chemical composition and a yield strength of 95 ksi grade is described.

FIG. 1A is a view illustrating the relation between the amount of dissolved C and a fracture toughness value $K_{ISSC}$ for respective test numbers having a yield strength of 95 ksi grade in the examples. FIG. 1A was obtained by the following method. FIG. 1A was created using the amount of dissolved C (mass %) and the fracture toughness value $K_{ISSC}$ (MPa Nm) obtained with respect to steel materials for which, among the steel materials of the examples that are described later, conditions of the aforementioned chemical composition is satisfied and a yield strength is 95 ksi grade (655 to less than 758 MPa) and a yield ratio is 85% or more.

Note that, adjustment of the yield strength of the steel materials indicated in FIG. 1A was performed by adjusting the tempering temperature. Further, with respect to the SSC resistance, if the fracture toughness value $K_{ISSC}$ obtained by a DCB test that is described later was 42.0 MPa√m or more, it was determined that the SSC resistance was good.

Referring to FIG. 1A, in a steel material in which the conditions of the aforementioned chemical composition are satisfied, when the amount of dissolved C was 0.010 mass % or more, the fracture toughness value $K_{ISSC}$ became 42.0 MPa√m or more, indicating excellent SSC resistance. On the other hand, in a steel material in which the conditions of the aforementioned chemical composition are satisfied, when the amount of dissolved C was more than 0.050 mass %/9, the fracture toughness value $K_{ISSC}$ was less than 42.0 MPa√m. In other words, it was clarified that when the amount of dissolved C is too high, conversely, the SSC resistance decreases.

The reason the SSC resistance decreases when the amount of dissolved C is too high as described above has not been clarified. However, with respect to the range of the chemical composition and yield strength (95 ksi grade) of the present embodiment, excellent SSC resistance can be obtained if the amount of dissolved C is made 0.050 mass % or less.

The present inventors further conducted detailed studies regarding the relation between the amount of dissolved C and SSC resistance of a steel material having a yield strength of 110 ksi grade (758 to less than 862 MPa). Specifically, with reference to the figures, the relation between the amount of dissolved C and SSC resistance of the steel material containing aforementioned chemical composition and a yield strength of 110 ksi grade is described.

Figure 1B:
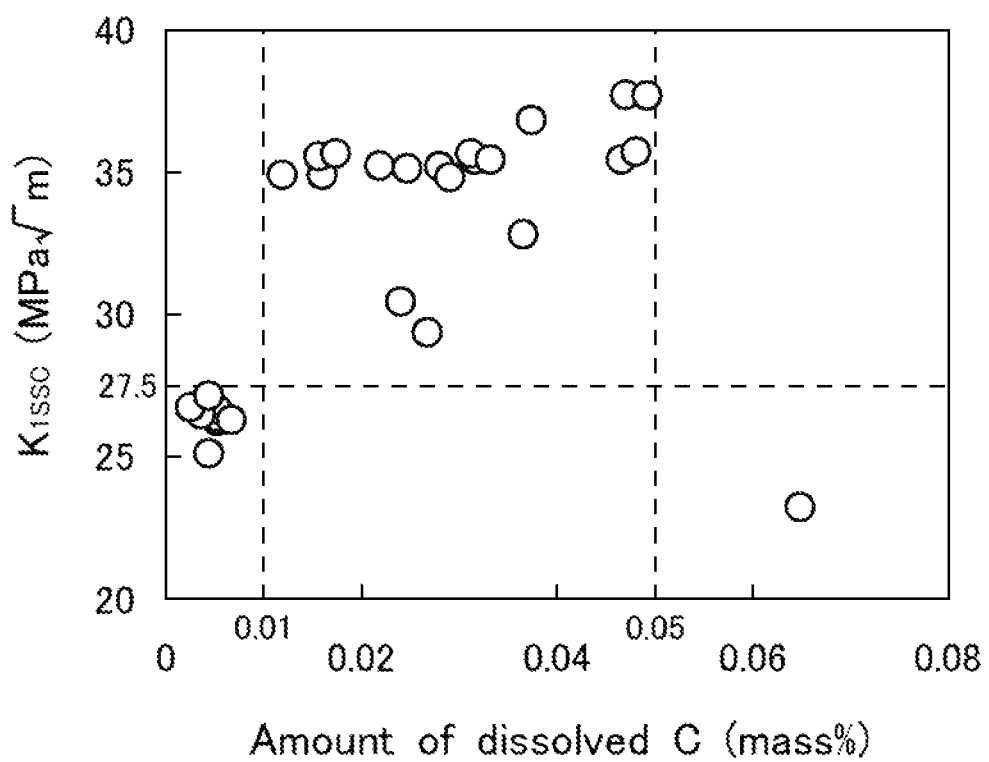
FIG. 1B is a view illustrating the relation between the amount of dissolved C and a fracture toughness value $K_{ISSC}$ for respective test numbers having a yield strength of 110 ksi grade in the examples.

FIG. 1B is a view illustrating the relation between the amount of dissolved C and a fracture toughness value $K_{ISSC}$ for respective test numbers having a yield strength of 110 ksi grade in the examples. FIG. 1B was obtained by the following method. FIG. 1B was created using the amount of dissolved C (mass %) and the fracture toughness value $K_{ISSC}$ (MPa$\sqrt{m}$) obtained with respect to steel materials for which, among the steel materials of the examples that are described later, conditions of the aforementioned chemical composition is satisfied and a yield strength is 110 ksi grade (758 to less than 862 MPa) and a yield ratio is 85% or more.

Note that, adjustment of the yield strength of the steel materials indicated in FIG. 1B was performed by adjusting the tempering temperature. Further, with respect to the SSC resistance, if the fracture toughness value $K_{ISSC}$ obtained by a DCB test that is described later was 27.5 MPa$\sqrt{m}$ or more, it was determined that the SSC resistance was good.

Referring to FIG. 1B, in a steel material in which the conditions of the aforementioned chemical composition are satisfied, when the amount of dissolved C was 0.010 mass % or more, the fracture toughness value $K_{ISSC}$ became 27.5 MPa$\sqrt{m}$ or more, indicating excellent SSC resistance. On the other hand, in a steel material in which the conditions of the aforementioned chemical composition are satisfied, when the amount of dissolved C was more than 0.050 mass %, the fracture toughness value $K_{ISSC}$ was less than 27.5 MPa$\sqrt{m}$. In other words, it was clarified that when the amount of dissolved C is too high, conversely, the SSC resistance decreases.

The reason the SSC resistance decreases when the amount of dissolved C is too high as described above has not been clarified. However, with respect to the range of the chemical composition and yield strength (110 ksi grade) of the present embodiment, excellent SSC resistance can be obtained if the amount of dissolved C is made 0.050 mass % or less.

Therefore, in a case where a steel material contains the aforementioned chemical composition, even if the yield strength is 95 ksi grade (655 to less than 758 MPa) or 110 ksi grade (758 to less than 862 MPa), when the amount of dissolved C is 0.010 to 0.050 mass %, excellent SSC resistance can be obtained. Accordingly, in the present embodiment, the amount of dissolved C of the steel material is set within the range of 0.010 to 0.050 mass %.

Note that, the microstructure of the steel material according to the present embodiment is made a microstructure that is principally composed of tempered martensite and tempered bainite. The term "principally composed of tempered martensite and tempered bainite" means that the volume ratio of tempered martensite and tempered bainite is 90% or more. When the microstructure of the steel material is principally composed of tempered martensite and tempered bainite, in the steel material according to the present embodiment, the yield strength is in a range of 655 to less than 862 MPa (95 ksi grade or 110 ksi grade), and a yield ratio (ratio of the yield strength to the tensile strength; in other words, yield ratio (YR)=yield strength (YS)/tensile strength (TS)) is 85% or more.

A steel material according to the present embodiment that was completed based on the above findings contains a chemical composition consisting of in mass %, C: 0.20 to 0.50%, Si: 0.05 to 0.50%, Mn: 0.05 to 1.00%0, P: 0.030% or less, S: 0.0100% or less, Al: 0.005 to 0.100%, Cr: 0.10 to 1.50%, Mo: 0.25 to 1.50%, Ti: 0.002 to 0.050%, N: 0.0100% or less, 0:0.0100% or less, B: 0 to 0.0050%, V: 0 to 0.30%, Nb: 0 to 0.100%, Ca: 0 to 0.0100%, Mg: 0 to 0.0100%, Zr: 0 to 0.0100%, rare earth metal: 0 to 0.0100%, Co: 0 to 0.50%, W: 0 to 0.50%, Ni: 0 to 0.50% and Cu: 0 to 0.50%, with the balance being Fe and impurities. The steel material according to the present embodiment contains an amount of dissolved C within a range of 0.010 to 0.050 mass %. In the steel material according to the present embodiment, the yield strength is within a range of 655 to less than 862 MPa, and the yield ratio is 85% or more.

In the present description, although not particularly limited, the steel material is, for example, a steel pipe or a steel plate. Preferably, the steel material is an oil-well steel material that is used for oil wells, further preferably is an oil-well steel pipe. In the present description, as described above, the term "oil wells" is generic name of oil wells and gas wells.

The aforementioned chemical composition may contain B in an amount of 0.0001 to 0.0050%.

The aforementioned chemical composition may contain one or more types of element selected from the group consisting of V: 0.01 to 0.30% and Nb: 0.002 to 0.100%.

The aforementioned chemical composition may contain one or more types of element selected from the group consisting of Ca: 0.0001 to 0.0100%, Mg: 0.0001 to 0.0100%, Zr: 0.0001 to 0.0100% and rare earth metal: 0.0001 to 0.0100%.

The aforementioned chemical composition may contain one or more types of element selected from the group consisting of Co: 0.02 to 0.50% and W: 0.02 to 0.50%.

The aforementioned chemical composition may contain one or more types of element selected from the group consisting of Ni: 0.02 to 0.50% and Cu: 0.02 to 0.50%.

The aforementioned steel material may be an oil-well steel pipe.

In the present description, the oil-well steel pipe may be a steel pipe that is used for a line pipe or may be a steel pipe used for oil country tubular goods (OCTG). The oil-well steel pipe may be a seamless steel pipe, or may be a welded steel pipe. The oil country tubular goods are, for example, steel pipes that are used as casing pipes or tubing pipes.

The aforementioned steel material may be a seamless steel pipe.

If the oil-well steel pipe according to the present embodiment is a seamless steel pipe, even if the wall thickness is 15 mm or more, the oil-well steel pipe will have a yield strength within a range of 655 to less than 862 MPa (95 ksi grade or 110 ksi grade) and will also have excellent SSC resistance.

The term "amount of dissolved C" mentioned above means the difference between the amount of C (mass %) in carbides in the steel material and the C content of the chemical composition of the steel material. The amount of C in carbides in the steel material is determined by Formula (1) to Formula (5) using an Fe concentration <Fe>a, a Cr concentration <Cr>a, an Mn concentration <Mn>a, an Mo concentration <Mo>a, a V concentration <V>a and an Nb concentration <Nb>a in carbides (cementite and MC-type carbides) obtained as residue when extraction residue analysis is performed on the steel material, and an Fe concentration $<Fe>b$, a Cr concentration $<Cr>b$, an Mn concentration $<Mn>b$ and an Mo concentration $<Mo>b$ in cementite obtained by performing point analysis by energy dispersive X-ray spectrometry (hereunder, referred to as "EDS") with respect to cementite identified by performing a transmission electron microscope (hereunder, referred to as "TEM") observation of a replica film obtained by an extraction replica method.

$$<Mo>c = (<Fe>a + <Cr>a + <Mn>a) \times <Mo>b / (<Fe>b + <Cr>b + <Mn>b) \quad (1)$$

$$<Mo>d = <Mo>a - <Mo>c \quad (2)$$

$$<C>a = (<Fe>a/55.85 + <Cr>a/52 + <Mn>a/53.94 + <Mo>c/95.9)/3 \times 12 \quad (3)$$

$$<C>b = (<V>a/50.94 + <Mo>d/95.9 + <Nb>a/92.9) \times 12 \quad (4)$$

$$(\text{amount of dissolved C}) = <C> - (<C>a + <C>b) \quad (5)$$

Note that, in the present description, the term "cementite" means carbides containing an Fe content of 50 mass % or more.

Hereunder, the steel material according to the present embodiment is described in detail. The symbol "%" in relation to an element means "mass percent" unless specifically stated otherwise.

[Chemical Composition]

The steel material according to the present embodiment is suitable for using in the sour environment. The chemical composition of the steel material according to the present embodiment contains the following elements.

C: 0.20 to 0.50%

Carbon (C) enhances the hardenability and increases the strength of the steel material. C also promotes spheroidization of carbides during tempering in the production process, and increases the SSC resistance of the steel material. If the carbides are dispersed, the strength of the steel material increases further. These effects will not be obtained if the C content is too low. On the other hand, if the C content is too high, the toughness of the steel material will decrease and quench cracking is liable to occur. Therefore, the C content is within the range of 0.20 to 0.50%. A preferable lower limit of the C content is 0.23%, and more preferably is 0.25%. A preferable upper limit of the C content is 0.45%, and more preferably is 0.40.

Si: 0.05 to 0.50%

Silicon (Si) deoxidizes the steel. If the Si content is too low, this effect is not obtained. On the other hand, if the Si content is too high, the SSC resistance of the steel material decreases. Therefore, the Si content is within the range of 0.05 to 0.50%. A preferable lower limit of the Si content is 0.15%, and more preferably is 0.20%. A preferable upper limit of the Si content is 0.45%, and more preferably is 0.40%.

Mn: 0.05 to 1.00%

Manganese (Mn) deoxidizes the steel material. Mn also enhances the hardenability of the steel material. If the Mn content is too low, these effects are not obtained. On the other hand, if the Mn content is too high, Mn segregates at grain boundaries together with impurities such as P and S. In such a case, the SSC resistance of the steel material will decrease. Therefore, the Mn content is within a range of 0.05 to 1.00%4. A preferable lower limit of the Mn content is 0.25%, and more preferably is 0.30%. A preferable upper limit of the Mn content is 0.90%, and more preferably is 0.80%.

P: 0.030% or less

Phosphorous (P) is an impurity. In other words, the P content is more than 0%. P segregates at the grain boundaries and decreases the SSC resistance of the steel material. Therefore, the P content is 0.030% or less. A preferable upper limit of the P content is 0.020%, and more preferably is 0.015%. Preferably, the P content is as low as possible. However, if the P content is excessively reduced, the production cost increases significantly. Therefore, when taking industrial production into consideration, a preferable lower limit of the P content is 0.0001%, more preferably is 0.0002%, and further preferably is 0.003%.

S: 0.0100% or less

Sulfur (S) is an impurity. In other words, the S content is more than 0%. S segregates at the grain boundaries and decreases the SSC resistance of the steel material. Therefore, the S content is 0.0100% or less. A preferable upper limit of the S content is 0.0050%, and more preferably is 0.0030%. Preferably, the S content is as low as possible. However, if the S content is excessively reduced, the production cost increases significantly. Therefore, when taking industrial production into consideration, a preferable lower limit of the S content is 0.0001%, more preferably is 0.0002%, and further preferably is 0.0003%.

Al: 0.005 to 0.100%

Aluminum (Al) deoxidizes the steel material. If the Al content is too low, this effect is not obtained and the SSC resistance of the steel material decreases. On the other hand, if the Al content is too high, coarse oxide-based inclusions are formed and the SSC resistance of the steel material decreases. Therefore, the Al content is within a range of 0.005 to 0.100%. A preferable lower limit of the Al content is 0.015%, and more preferably is 0.020%. A preferable upper limit of the Al content is 0.080%, and more preferably is 0.060%. In the present description, the "Al" content means "acid-soluble Al", that is, the content of "sol. Al".

Cr: 0.10 to 1.50%

Chromium (Cr) enhances the hardenability of the steel material. Cr also increases temper softening resistance of the steel material and enables high-temperature tempering. As a result, the SSC resistance of the steel material increases. If the Cr content is too low, these effects are not obtained. On the other hand, if the Cr content is too high, the toughness and SSC resistance of the steel material decreases. Therefore, the Cr content is within a range of 0.10 to 1.50%. A preferable lower limit of the Cr content is 0.25%, and more preferably is 0.30%. A preferable upper limit of the Cr content is 1.30%.

Mo: 0.25 to 1.50%

Molybdenum (Mo) enhances the hardenability of the steel material. Mo also forms fine carbides and increases the temper softening resistance of the steel material. As a result, Mo increases the SSC resistance of the steel material by high temperature tempering. If the Mo content is too low, these effects are not obtained. On the other hand, if the Mo content is too high, the aforementioned effects are saturated. Therefore, the Mo content is within a range of 0.25 to 1.50%. A preferable lower limit of the Mo content is 0.50%, and more preferably is 0.65%. A preferable upper limit of the Mo content is 1.30%, and more preferably is 1.25%.

Ti: 0.002 to 0.050%

Titanium (Ti) forms nitrides, and refines crystal grains by the pinning effect. As a result, the strength of the steel material increases. If the Ti content is too low, this effect is not obtained. On the other hand, if the Ti content is too high, Ti nitrides coarsen and the SSC resistance of the steel material decreases. Therefore, the Ti content is within a range of 0.002 to 0.050%. A preferable lower limit of the Ti content is 0.003%, and more preferably is 0.005%. A preferable upper limit of the Ti content is 0.030%, and more preferably is 0.020%.

N: 0.0100% or less

Nitrogen (N) is unavoidably contained. In other words, the N content is more than 0%. N combines with Ti to form fine nitrides, and refines crystal grains of the steel material by the pinning effect. However, if the N content is too high, N will form coarse nitrides and the SSC resistance of the steel material will decrease. Therefore, the N content is 0.0100% or less. A preferable upper limit of the N content is 0.0050%, and more preferably is 0.0040%. To obtain the above effect more effectively, a preferable lower limit of the N content is 0.0005%, more preferably is 0.0010%, and further preferably is 0.0020%.

O: 0.0100% or less

Oxygen (O) is an impurity. In other words, the O content is more than 0%. O forms coarse oxides and reduces the corrosion resistance of the steel material. Therefore, the O content is 0.0100% or less. A preferable upper limit of the O content is 0.0030%, and more preferably is 0.0020%. Preferably, the O content is as low as possible. However, if the O content is excessively reduced, the production cost increases significantly. Therefore, when taking industrial production into consideration, a preferable lower limit of the O content is 0.0001%, more preferably is 0.0002%, and further preferably is 0.0003%.

The balance of the chemical composition of the steel material according to the present embodiment is Fe and impurities. Here, the term "impurities" refers to elements which, during industrial production of the steel material, are mixed in from ore or scrap that is used as a raw material of the steel material, or from the production environment or the like, and which are allowed within a range that does not adversely affect the steel material according to the present embodiment.

[Regarding Optional Elements]

The chemical composition of the steel material described above may further contain B in lieu of a part of Fe.

B: 0 to 0.0050%

Boron (B) is an optional element, and need not be contained. In other words, the B content may be 0%. If contained B dissolves in the steel, enhances the hardenability of the steel material and increases the steel material strength. If even a small amount of B is contained, this effect is obtained to a certain extent. However, if the B content is too high, coarse nitrides form and the SSC resistance of the steel material decreases. Therefore, the B content is within a range of 0 to 0.0050%. A preferable lower limit of the B content is more than 0%, more preferably is 0.0001%, further preferably is 0.0003%, and further preferably is 0.0007%. In a case where it is intended to obtain a yield strength of 758 MPa or more, it is preferable that the steel material contains B in an amount of 0.0001% or more. When B is contained in an amount of 0.0001% or more, the yield strength of the steel material is stably made 758 MPa or more. Therefore, in a case where the yield strength is within a range of 758 to less than 862 MPa, a preferable lower limit of the B content is 0.0001%, more preferably is 0.0003%, and further preferably is 0.0007%. A preferable upper limit of the B content is 0.0030%, and more preferably is 0.0025%.

The chemical composition of the steel material described above may further contain one or more types of element selected from the group consisting of V and Nb in lieu of a part of Fe. Each of these elements is an optional element, and increases the SSC resistance of the steel material.

V: 0 to 0.30%

Vanadium (V) is an optional element, and need not be contained. In other words, the V content may be 0%. If contained, V combines with C or N to form carbides, nitrides or carbo-nitrides and the like (hereinafter, referred to as "carbo-nitrides and the like"). These carbo-nitrides and the like refine the substructure of the steel material by the pinning effect, and improve the SSC resistance of the steel. V also forms fine carbides during tempering. The fine carbides increase the temper softening resistance of the steel material, and increase the strength of the steel material. In addition, because V also forms spherical MC-type carbides, V suppresses the formation of acicular $M_2C$-type carbides and thereby increases the SSC resistance of the steel material. If even a small amount of V is contained, these effects are obtained to a certain extent. However, if the V content is too high, the toughness of the steel material decreases. Therefore, the V content is within the range of 0 to 0.30%. A preferable lower limit of the V content is more than 0%, more preferably is 0.01%, and further preferably is 0.02%. A preferable upper limit of the V content is 0.20%, more preferably is 0.15%, and further preferably is 0.12%.

Nb: 0 to 0.100%

Niobium (Nb) is an optional element, and need not be contained. In other words, the Nb content may be 0%. If contained, Nb forms carbo-nitrides and the like. These carbo-nitrides and the like refine the substructure of the steel material by the pinning effect, and increase the SSC resistance of the steel material. In addition, because Nb also forms spherical MC-type carbides, Nb suppresses the formation of acicular $M_2C$-type carbides and thereby increases the SSC resistance of the steel material. If even a small amount of Nb is contained, these effects are obtained to a certain extent. However, if the Nb content is too high, carbo-nitrides and the like are excessively formed and the SSC resistance of the steel material decreases. Therefore, the Nb content is within the range of 0 to 0.100%. A preferable lower limit of the Nb content is more than 0%, more preferably is 0.002%, further preferably is 0.003%, and further preferably is 0.007%. In a case where it is intended to obtain a yield strength of 758 MPa or more, it is preferable that the steel material contains Nb in an amount of 0.002% or more. When Nb is contained in an amount of 0.002% or more, the yield strength of the steel material is stably made 758 MPa or more. Therefore, in a case where the yield strength is within a range of 758 to less than 862 MPa, a preferable lower limit of the Nb content is 0.002%, more preferably is 0.003%, and further preferably is 0.007%. A preferable upper limit of the Nb content is less than 0.050%, more preferably is 0.035%, and further preferably is 0.030%.

The chemical composition of the steel material described above may further contain one or more types of element selected from the group consisting of Ca. Mg, Zr and rare earth metal (REM) in lieu of a part of Fe. Each of these elements is an optional element, and increases the SSC resistance of the steel material.

Ca: 0 to 0.0100%

Calcium (Ca) is an optional element, and need not be contained. In other words, the Ca content may be 0%. If contained, Ca renders S in the steel material harmless by forming sulfides, and thereby increases the SSC resistance of the steel material. If even a small amount of Ca is contained, this effect is obtained to a certain extent. However, if the Ca content is too high, oxides in the steel material coarsen and the SSC resistance of the steel material decreases. Therefore, the Ca content is within the range of 0 to 0.0100%. A preferable lower limit of the Ca content is more than 0%, more preferably is 0.0001%, further preferably is 0.0003%, and further preferably is 0.0006%, and even further preferably is 0.0010%. A preferable upper limit of the Ca content is 0.0025%, and more preferably is 0.0020%.

Mg: 0 to 0.0100%

Magnesium (Mg) is an optional element, and need not be contained. In other words, the Mg content may be 0%. If contained, Mg renders S in the steel material harmless by forming sulfides, and thereby increases the SSC resistance of the steel material. If even a small amount of Mg is contained, this effect is obtained to a certain extent. However, if the Mg content is too high, oxides in the steel material coarsen and decrease the SSC resistance of the steel material. Therefore, the Mg content is within the range of 0 to 0.0100%. A preferable lower limit of the Mg content is more than 0%, more preferably is 0.0001%, further preferably is 0.0003%, and further preferably is 0.0006%, and even further preferably is 0.0010%. A preferable upper limit of the Mg content is 0.0025%, and more preferably is 0.0020'.

Zr 0 to 0.0100%

Zirconium (Zr) is an optional element, and need not be contained. In other words, the Zr content may be 0%. If contained, Zr renders S in the steel material harmless by forming sulfides, and thereby increases the SSC resistance of the steel material. If even a small amount of Zr is contained, this effect is obtained to a certain extent. However, if the Zr content is too high, oxides in the steel material coarsen, and decreases the SSC resistance of the steel material. Therefore, the Zr content is within the range of 0 to 0.0100%. A preferable lower limit of the Zr content is more than 0%, more preferably is 0.0001%, further preferably is 0.0003%, and further preferably is 0.0006%, and even further preferably is 0.0010%. A preferable upper limit of the Zr content is 0.0025%, and more preferably is 0.0020%.

Rare earth metal (REM): 0 to 0.0100%

Rare earth metal (REM) is an optional element, and need not be contained. In other words, the REM content may be 0%. If contained, REM renders S in the steel material harmless by forming sulfides, and thereby increases the SSC resistance of the steel material. REM also combines with P in the steel material and suppresses segregation of P at the crystal grain boundaries. Therefore, a decrease in the SSC resistance of the steel material that is attributable to segregation of P is suppressed. If even a small amount of REM is contained, these effects are obtained to a certain extent. However, if the REM content is too high, oxides coarsen and the SSC resistance of the steel material decrease. Therefore, the REM content is within the range of 0 to 0.0100%. A preferable lower limit of the REM content is more than 0%, more preferably is 0.0001%, further preferably is 0.0003%, and further preferably is 0.0006%. A preferable upper limit of the REM content is 0.0025%, and more preferably is 0.0020%.

Note that, in the present description the term "REM" refers to one or more types of element selected from a group consisting of scandium (Sc) which is the element with atomic number 21, yttrium (Y) which is the element with atomic number 39, and the elements from lanthanum (La) with atomic number 57 to lutetium (Lu) with atomic number 71 that are lanthanoids. Further, in the present description the term "REM content" refers to the total content of these elements.

In a case where two or more types of element selected from the aforementioned group containing Ca, Mg, Zr and REM are contained in combination, the total of the contents of these elements is preferably 0.0100% or less, and more preferably is 0.0050% or less.

The chemical composition of the steel material described above may further contain one or more types of element selected from the group consisting of Co and W in lieu of a part of Fe. Each of these elements is an optional element that forms a protective corrosion coating in the sour environment and suppresses hydrogen penetration to the steel material. By this means, each of these elements increases the SSC resistance of the steel material.

Co: 0 to 0.50%

Cobalt (Co) is an optional element, and need not be contained. In other words, the Co content may be 0%. If contained, Co forms a protective corrosion coating in the sour environment and suppresses hydrogen penetration to the steel material. By this means, Co increases the SSC resistance of the steel material. If even a small amount of Co is contained, this effect is obtained to a certain extent. However, if the Co content is too high, the hardenability of the steel material will decrease, and the steel material strength will decrease. Therefore, the Co content is within the range of 0 to 0.50%. A preferable lower limit of the Co content is more than 0%, more preferably is 0.02%, and further preferably is 0.05%. A preferable upper limit of the Co content is 0.45%, and more preferably is 0.40%.

W: 0 to 0.50%

Tungsten (W) is an optional element, and need not be contained. In other words, the W content may be 0%. If contained, W forms a protective corrosion coating in the sour environment and suppresses hydrogen penetration to the steel material. By this means, W increases the SSC resistance of the steel material. If even a small amount of W is contained, this effect is obtained to a certain extent. However, if the W content is too high, coarse carbides form in the steel material and the SSC resistance of the steel material decreases. Therefore, the W content is within the range of 0 to 0.50%. A preferable lower limit of the W content is more than 0%, more preferably is 0.02%, and further preferably is 0.05%. A preferable upper limit of the W content is 0.45%, and more preferably is 0.40%.

The chemical composition of the steel material described above may further contain one or more types of element selected from the group consisting of Ni and Cu in lieu of a part of Fe. Each of these elements is an optional element, and increases the hardenability of the steel material.

Ni: 0 to 0.50%

Nickel (Ni) is an optional element, and need not be contained. In other words, the Ni content may be 0%. If contained, Ni enhances the hardenability of the steel material and increases the steel material strength. If even a small amount of Ni is contained, this effect is obtained to a certain extent. However, if the Ni content is too high, the Ni will promote local corrosion, and the SSC resistance of the steel material will decrease. Therefore, the Ni content is within the range of 0 to 0.50%. A preferable lower limit of the Ni content is more than 0%, and more preferably is 0.02%. A preferable upper limit of the Ni content is 0.35%, and more preferably is 0.25%.

Cu: 0 to 0.50%

Copper (Cu) is an optional element, and need not be contained. In other words, the Cu content may be 0%. If contained, Cu enhances the hardenability of the steel material and increases the steel material strength. If even a small amount of Cu is contained, this effect is obtained to a certain extent. However, if the Cu content is too high, the hardenability of the steel material will be too high, and the SSC resistance of the steel material will decrease. Therefore, the Cu content is within the range of 0 to 0.50%. A preferable lower limit of the Cu content is more than 0%, and more preferably is 0.02%. A preferable upper limit of the Cu content is 0.35%, and more preferably is 0.25%.

[Amount of Dissolved C]

The steel material according to the present embodiment contains an amount of dissolved C which is within the range of 0.010 to 0.050 mass %. If the amount of dissolved C is less than 0.010 mass %, the immobilization of dislocations in the steel material will be insufficient and excellent SSC resistance will not be obtained. On the other hand, if the amount of dissolved C is more than 0.050 mass %, conversely, the SSC resistance of the steel material will decrease. Therefore, the amount of dissolved C is within the range of 0.010 to 0.050 mass %. A preferable lower limit of the amount of dissolved C is 0.020 mass % and more preferably is 0.030 mass %.

An amount of dissolved C within the aforementioned range is obtained by, for example, controlling the holding time in the tempering process and controlling the cooling rate in the tempering process. The reason is as described hereunder.

The amount of dissolved C is highest immediately after quenching. Immediately after quenching, C is dissolved except for a small amount thereof that precipitated as carbides during quenching. In the tempering process thereafter, some of the C precipitates as carbides as a result of being held for tempering. As a result, the amount of dissolved C decreases toward the thermal equilibrium concentration with respect to the tempering temperature. If the holding time for tempering is too short, this effect will not be obtained and the amount of dissolved C will be too high. On the other hand, if the holding time for tempering is too long, the amount of dissolved C will approach the aforementioned thermal equilibrium concentration, and will hardly change. Therefore, in the present embodiment, the holding time during tempering is within the range of 10 to 180 minutes.

If the cooling rate during cooling after tempering in the tempering process is slow, the dissolved C will reprecipitate while the temperature is decreasing. In the conventional methods for producing steel material, because cooling after tempering has been performed by allowing the steel material to cool, the cooling rate has been slow. Consequently, the amount of dissolved C has been almost 0 masse. Therefore, in the present embodiment, the cooling rate after tempering is raised, and a dissolved C amount within the range of 0.010 to 0.050 mass % is obtained.

The cooling method is, for example, a method that performs forced cooling of the steel material continuously from the tempering temperature to thereby continuously decrease the surface temperature of the steel material. Examples of this kind of continuous cooling treatment include a method that cools the steel material by immersion in a water bath, and a method that cools the steel material in an accelerated manner by shower water cooling, mist cooling or forced air cooling.

The cooling rate after tempering is measured at a region that is most slowly cooled within a cross-section of the steel material that is tempered (for example, in the case of forcedly cooling both surfaces, the cooling rate is measured at the center portion of the steel material thickness). Specifically, in a case where the steel material is a steel plate, the cooling rate after tempering can be determined based on a temperature measured by a sheath-type thermocouple that is inserted into the center portion of the thickness of the steel plate. In a case where the steel material is a steel pipe, the cooling rate after tempering can be determined based on a temperature measured by a sheath-type thermocouple that is inserted into the center portion of the wall thickness of the steel pipe. Further, in a case of forcedly cooling only a surface on one side of the steel material, the cooling rate after tempering can be determined based on the surface temperature on the non-forcedly cooled side of the steel material that is measured by means of a non-contact type infrared thermometer.

The temperature region from 600° C. to 200° C. is a temperature region in which diffusion of C is comparatively fast. On the other hand, if the cooling rate after tempering is too fast, very little of the C that had dissolved after being held during tempering precipitates. Consequently, in some cases the amount of dissolved C is excessive. Therefore, in the present embodiment, the average cooling rate in the temperature region from 600° C. to 200° C. is made 5 to 100° C./sec.

According to this method, in the steel material according to the present embodiment, the amount of dissolved C can be made to fall within the range of 0.010 to 0.050 mass %. However, the amount of dissolved C in the steel material may be adjusted to within the range of 0.010 to 0.050 mass % by another method.

[Method for Calculating Amount of Dissolved C]

The term "amount of dissolved C" means the difference between the amount of C (mass % o) in carbides in the steel material and the C content of the chemical composition of the steel material. The amount of C in carbides in the steel material is determined by Formula (1) to Formula (5) using an Fe concentration <Fe>, a Cr concentration <Cr>a, an Mn concentration <Mn>a, an Mo concentration <Mo>a, a V concentration <V>a and an Nb concentration <Nb>a in carbides (cementite and MC-type carbides) obtained as residue when extraction residue analysis is performed on the steel material, and an Fe concentration <Fe>b, a Cr concentration <Cr>b, an Mn concentration <Mn>b and an Mo concentration <Mo>b in cementite obtained by performing point analysis by EDS with respect to cementite identified by performing TEM observation of a replica film obtained by an extraction replica method.

$$<Mo>c = (<Fe>a + <Cr>a + <Mn>a) \times <Mo>b / (<Fe>b + <Cr>b + <Mn>b) \quad (1)$$

$$<Mo>d = <Mo>a - <Mo>c \quad (2)$$

$$<C>a = (<Fe>a/55.85 + <Cr>a/52 + <Mn>a/53.94 + <Mo>c/95.9)/3 \times 12 \quad (3)$$

$$<C>b = (<V>a/50.94 + <Mo>d/95.9 + <Nb>a/92.9) \times 12 \quad (4)$$

$$(\text{amount of dissolved C}) = <C> - (<C>a + <C>b) \quad (5)$$

Note that, in the present description, the term "cementite" means carbides containing an Fe content of 50 mass % or more. Hereunder, the method for calculating the amount of dissolved C is described in detail.

[Determination of C Content of Steel Material]

An analysis sample having the shape of a machined chip is taken from the steel material. In a case where the steel material is a steel plate, an analysis sample is taken from a center portion of the thickness. In a case where the steel material is a steel pipe, an analysis sample is taken from a center portion of the wall thickness. The C content (mass %) is analyzed by an oxygen-stream combustion-infrared absorption method. The resulting value was taken to be the C content (<C>) of the steel material.

[Calculation of C Amount that Precipitates as Carbides (Precipitated C Amount)]

The precipitated C amount is calculated by the following procedures 1 to 4. Specifically, in procedure 1 an extraction residue analysis is performed. In procedure 2, an extraction replica method using a TEM, and an element concentration analysis (hereunder, referred to as "EDS analysis") of elements in cementite is performed by EDS. In procedure 3, the Mo content is adjusted. In procedure 4, the precipitated C amount is calculated.

[Procedure 1. Determination of Residual Amounts of Fe. Cr, Mn. Mo, V and Nb by Extraction Residue Analysis]

In procedure 1, carbides in the steel material are captured as residue, and the contents of Fe, Cr, Mn, Mo, V and Nb in the residue are determined. Here, the term "carbides" is a generic term for cementite ($M_3C$-type carbides) and MC-type carbides. The specific procedure is as follows. A cylindrical test specimen having a diameter of 6 mm and a length of 50 mm is extracted from the steel material. In a case where the steel material is a steel plate, the cylindrical test specimen is extracted from a center portion of the thickness in a manner so that the center of the thickness becomes the center of the cross-section. In a case where the steel material is a steel pipe, the cylindrical test specimen is extracted from a center portion of the wall thickness of the steel pipe in a manner so that the center of the wall thickness becomes the center of the cross-section. The surface of the cylindrical test specimen is polished to remove about 50 μm by preliminary electropolishing to obtain a newly formed surface. The electropholished test specimen is subjected to electrolysis in an electrolyte solution (10% acetylacetone+ 1% tetra-ammonium+methanol). The electrolyte solution after electrolysis is passed through a 0.2-μm filter to capture residue. The obtained residue is subjected to acid decomposition, and the concentrations of Fe, Cr, Mn, Mo, V and Nb are determined in units of mass percent by ICP (inductively coupled plasma) optical emission spectrometry. The concentrations are defined as <Fe>a, <Cr>a, <Mn>a, <Mo>a, <V>a and <Nb>a, respectively.

[Procedure 2. Determination of Content of Fe, Cr, Mn and Mo in Cementite by Extraction Replica Method and EDS]

In procedure 2, the content of each of Fe, Cr, Mn and Mo in cementite is determined. The specific procedure is as follows. A micro test specimen is cut out from the steel material. In a case where the steel material is a steel plate, the micro test specimen is cut out from a center portion of the thickness. In a case where the steel material is a steel pipe, the micro test specimen is cut out from a center portion of the wall thickness of the steel pipe. The surface of the micro test specimen is finished by mirror polishing. The test specimen is immersed for 10 minutes in a 3% nital etching reagent to etch the surface. The corroded surface is covered with a carbon deposited film. The test specimen whose surface is covered with the deposited film is immersed in a 5% nital etching reagent, and held therein for 20 minutes to cause the deposited film to peel off. The deposited film that peeled off is cleaned with ethanol, and thereafter is scooped up with a sheet mesh and dried. The deposited film (replica film) is observed using a TEM, and point analysis by EDS is performed with respect to 20 particles of cementite. The concentration of each of Fe, Cr, Mn and Mo is determined in units of mass percent when taking the total of the alloying elements excluding carbon in the cementite as 100%. The concentrations are determined for 20 particles of cementite, and the arithmetic average values for the respective elements are defined as <Fe>b, <Cr>b, <Mn>b and <Mo>b.

[Procedure 3. Adjustment of Mo Amount]

Next, the Mo concentration in the carbides is determined. In this case, Fe, Cr, Mn and Mo concentrate in cementite. On the other hand, V, Nb and Mo concentrate in MC-type carbides. In other words, Mo is caused to concentrate in both cementite and MC-type carbides by tempering. Therefore, the Mo amount is calculated separately for cementite and for MC-type carbides. Note that, in some cases a part of V also concentrates in cementite. However, the amount of V that concentrates in cementite is negligibly small in comparison to the amount of V that concentrates in MC-type carbides. Therefore, when determining the amount of dissolved C, V is regarded as concentrating only in MC-type carbides.

Specifically, the amount of Mo precipitating as cementite (<Mo>c) is calculated by Formula (1).

$$<Mo>c=(<Fe>a+<Cr>a+<Mn>a)\times <Mo>b/(<Fe>b+<Cr>b+<Mn>b) \quad (1)$$

On the other hand, the amount of Mo precipitating as MC-type carbides (<Mo>d) is calculated in units of mass percent by Formula (2).

$$<Mo>d=<Mo>a-<Mo>c \quad (2)$$

[Procedure 4. Calculation of Precipitated C Amount]

The precipitated C amount is calculated as the total of the C amount precipitating as cementite (<C>a) and the C amount precipitating as MC-type carbides (<C>b). <C>a and <C>b are calculated in units of mass percent by Formula (3) and Formula (4), respectively. Note that, Formula (3) is a formula that is derived from the fact that the structure of cementite is a $M_3C$ type structure (M include Fe. Cr, Mn and Mo).

$$<C>a=(<Fe>a/55.85+<Cr>a/52+<Mn>a/53.94+<Mo>c/95.9)/3\times 12 \quad (3)$$

$$<C>b=(<V>a/50.94+<Mo>d/95.9+<Nb>a/92.9)\times 12 \quad (4)$$

Thus, the precipitated C amount is <C>a+<C>b.

[Calculation of Amount of Dissolved C]

The amount of dissolved C (hereunder, also referred to as "<C>c") is calculated in units of mass percent by Formula (5) as a difference between the C content (<C>) and the precipitated C amount of the steel material.

$$<C>c=<C>-(<C>a+<C>b) \quad (5)$$

[Microstructure]

The microstructure of the steel material according to the present embodiment is principally composed of tempered martensite and tempered bainite. More specifically, the volume ratio of tempered martensite and/or tempered bainite in the microstructure is 90% or more. In other words, the total of the volume ratios of tempered martensite and tempered bainite in the microstructure is 90% or more. The balance of the microstructure is, for example, ferrite or perlite. If the microstructure of the steel material containing the aforementioned chemical composition contains tempered martensite and tempered bainite in an amount equivalent to a total volume ratio of 90% or more, the yield strength will be within the range of 655 to less than 862 MPa (95 ksi grade or 110 ksi grade), and the yield ratio will be 85% or more.

In the present embodiment, if the yield strength is within the range of 655 to less than 862 MPa (95 ksi grade or 110 ksi grade) and the yield ratio is 85% or more, it is assumed that the volume ratios of tempered martensite and tempered bainite in the microstructure is 90% or more. Preferably, the microstructure is composed of only tempered martensite and/or tempered bainite. In other words, the volume ratios of tempered martensite and tempered bainite in the microstructure may be 100%.

Note that, the following method can be adopted in the case of determining the volume ratios of tempered martensite and tempered bainite by observation. In a case where the steel material is a steel plate, a test specimen having an observation surface with dimensions of 10 mm in the rolling direction and 10 mm in the thickness direction is cut out from a center portion of the thickness. In a case where the steel material is a steel pipe, a test specimen having an observation surface with dimensions of 10 mm in the pipe axis direction and 8 mm in the wall thickness direction is cut out from a center portion of the wall thickness.

After polishing the observation surface of the test specimen to obtain a mirror surface, the test specimen is immersed for about 10 seconds in a nital etching reagent, to reveal the microstructure by etching. The etched observation surface is observed by means of a secondary electron image obtained using a scanning electron microscope (SEM), and observation is performed for 10 visual fields. The area of each visual field is 400 $\mu m^2$ (magnification of ×5000).

In each visual field, tempered martensite and tempered bainite are identified based on the contrast. The total of the area fractions of tempered martensite and tempered bainite that are identified is determined. In the present embodiment, the arithmetic average value of the totals of the area fractions of tempered martensite and tempered bainite determined in all visual fields is taken as the volume ratio of tempered martensite and tempered bainite.

[Shape of Steel Material]

The shape of the steel material according to the present embodiment is not particularly limited. The steel material is, for example, a steel pipe or a steel plate. In a case where the steel material is an oil-well steel pipe, preferably the steel material is a seamless steel pipe. In a case where the steel material is an oil-well steel pipe, the wall thickness is not particularly limited. A preferable wall thickness is 9 to 60 mm. The steel material according to the present embodiment is, in particular, suitable for use as a heavy-wall oil-well steel pipe. More specifically, even if the steel material according to the present embodiment is an oil-well steel pipe having a thick wall of 15 mm or more or, furthermore, 20 mm or more, the steel material exhibits excellent strength and SSC resistance.

[Yield Strength and Yield Ratio of Steel Material]

The yield strength of the steel material according to the present embodiment is within a range of 655 to less than 862 MPa (95 ksi grade or 110 ksi grade), and the yield ratio of the steel material is 85% or more. In short, the steel material according to the present embodiment has a yield strength of 95 ksi grade or 110 ksi grade, and a yield ratio of 85% or more.

The yield strength of the steel material according to the present embodiment is defined in accordance with ASTM E8 (2013). Specifically, the yield strength of the steel material according to the present embodiment is defined for each range of yield strength. More specifically, in a case where a yield strength of the steel material according to the present embodiment is within a range of 655 to less than 758 MPa (95 ksi grade), the term "yield strength" means the stress when elongation of 0.5% is obtained in a tensile test (0.5% yield stress). In a case where a yield strength of the steel material according to the present embodiment is within a range of 758 to less than 862 MPa (110 ksi grade), the term "yield strength" means the stress when elongation of 0.7% is obtained in a tensile test (0.7% yield stress).

Even though the steel material according to the present embodiment has a yield strength within the range of 655 to less than 862 MPa (95 ksi grade or 110 ksi grade), the steel material also has excellent SSC resistance by satisfying the conditions regarding the chemical composition, amount of dissolved C and microstructure, which are described above.

The yield strength of the steel material according to the present embodiment can be determined by the following method. A tensile test is performed in accordance with ASTM E8 (2013). A round bar test specimen is taken from the steel material according to the present embodiment. In a case where the steel material is a steel plate, the round bar test specimen is taken from the center portion of the thickness. In a case where the steel material is a steel pipe, the round bar test specimen is taken from the center portion of the wall thickness. Regarding the size of the round bar test specimen, for example, the round bar test specimen has a parallel portion diameter of 6.35 mm and a parallel portion length of 35.6 mm. Note that the axial direction of the round bar test specimen is parallel to the rolling direction of the steel material. A tensile test is performed in the atmosphere at normal temperature (25° C.) using the round bar test specimen.

In a case where the stress at the time of 0.5% elongation (0.5% yield stress) obtained in the tensile test is within a range of 655 to less than 758 MPa (95 ksi grade), 0.5% yield stress is defined as the yield strength. In a case where the stress at the time of 0.7% elongation (0.7% yield stress) obtained in the tensile test is within a range of 758 to less than 862 MPa (110 ksi grade) 0.7% yield stress is defined as the yield strength. Further, the largest stress during uniform elongation is defined as the tensile strength (MPa). The yield ratio (YR)(%) can be obtained by a ratio of the yield strength (YS) to the tensile strength (TS)(YR=YS/TS).

The steel material according to the present embodiment contains the aforementioned chemical composition, contains an amount of dissolved C within the range of 0.010 to 0.050 mass %, has a yield strength within a range of 655 to less than 862 MPa, and has a yield ratio of 85% or more. In this respect, when steel materials contain the chemical composition according to the present embodiment and the same microstructure (phases), the dislocation density is considered to be the dominant factor that determines the yield strength.

Specifically, the dislocation density of a steel material that contains the aforementioned chemical composition, contains an amount of dissolved C within the range of 0.010 to 0.050 mass %, has a yield strength within a range of 655 to less than 758 MPa (95 ksi grade), and has a yield ratio of 85% or more is within the range of $1.0 \times 10^{14}$ to less than $4.4 \times 10^{14}$ ($m^{-2}$). Furthermore, the dislocation density of a steel material that contains the aforementioned chemical composition, contains an amount of dissolved C within the range of 0.010 to 0.050 mass %, has a yield strength within a range of 758 to less than 862 MPa (110 ksi grade), and has a yield ratio of 85% or more is within the range of $4.4 \times 10^{14}$ to less than $6.5 \times 10^{14}$ ($m^{-2}$).

On the other hand, the dislocation density of a steel material that contains the aforementioned chemical composition, contains an amount of dissolved C within the range of 0.010 to 0.050 mass %, has a yield strength within a range of 862 to less than 965 MPa (125 ksi grade), and has a yield ratio of 85% or more is within the range of $6.5 \times 10^{14}$ to less than $9.2 \times 10^{14}$ $(m^{-2})$. The steel material according to the present embodiment contains the aforementioned chemical composition, the aforementioned amount of dissolved C, the aforementioned yield strength and the aforementioned yield ratio. Consequently, the dislocation density of the steel material according to the present embodiment differs from the dislocation density of a steel material that contains the aforementioned chemical composition, the aforementioned amount of dissolved C and the aforementioned yield ratio, but has a different yield strength.

The dislocation density of the steel material according to the present embodiment can be determined by the following method. A test specimen for use for dislocation density measurement is taken from the steel material according to the present embodiment. In a case where the steel material is a steel plate, the test specimen is taken from a center portion of the thickness. In a case where the steel material is a steel pipe, the test specimen is taken from a center portion of the wall thickness. The size of the test specimen is, for example, 20 mm width×20 mm length×2 mm thickness. The thickness direction of the test specimen is the thickness direction of the steel material (plate thickness direction or wall thickness direction). In this case, the observation surface of the test specimen is a surface having a size of 20 mm in width×20 mm in length.

The observation surface of the test specimen is mirror-polished, and furthermore electropolishing is performed using a 10 vol % perchloric acid (acetic acid solvent) solution to remove strain in the outer layer. The observation surface after the treatment is subjected to X-ray diffraction (XRD) to determine the half-value width ΔK of the peaks of the (110), (211) and (220) planes of the body-centered cubic structure (iron).

In the XRD, measurement of the half-value width ΔK is performed by employing CoKα lines as the X-ray source, 30 kV as the tube voltage, and 100 mA as the tube current. In addition, $LaB_6$ (lanthanum hexaboride) powder is used in order to measure a half-value width originating from the X-ray diffractometer.

The non-uniform strain E of the test specimen is determined based on the half-value width ΔK determined by the aforementioned method and the Williamson-Hall equation (Formula (6)).

$$\Delta K \times \cos\theta/\lambda = 0.9/D + 2\varepsilon \times \sin\theta/\lambda \quad (6)$$

In Formula (6), θ represents the diffraction angle, λ represents the wavelength of the X-ray, and D represents the crystallite diameter.

In addition, the dislocation density p $(m^{-2})$ can be determined using the obtained non-uniform strain s and Formula (7).

$$\rho = 14.4 \times \varepsilon^2/b^2 \quad (7)$$

In Formula (7), b represents the Burgers vector (b=0.248 (nm)) of the body-centered cubic structure (iron).

[SSC Resistance of Steel Material]

As described above, there is a possibility that dislocations will occlude hydrogen. That is, it has been considered that the higher the yield strength of the steel material is, the less the SSC resistance of the steel material that is obtained. Therefore, according to present embodiment, excellent SSC resistance is defined for each yield strength. Specifically, excellent SSC resistance is defined as follows.

[SSC Resistance when Yield Strength is 95 Ksi Grade]

In a case where the yield strength of the steel material is of 95 ksi grade, the SSC resistance of the steel material can be evaluated by a DCB test performed in accordance with "Method D" described in NACE TM0177-2005, and a low temperature SSC resistance test performed in accordance with "Method A" described in NACE TM0177-2005.

Figure 2A:
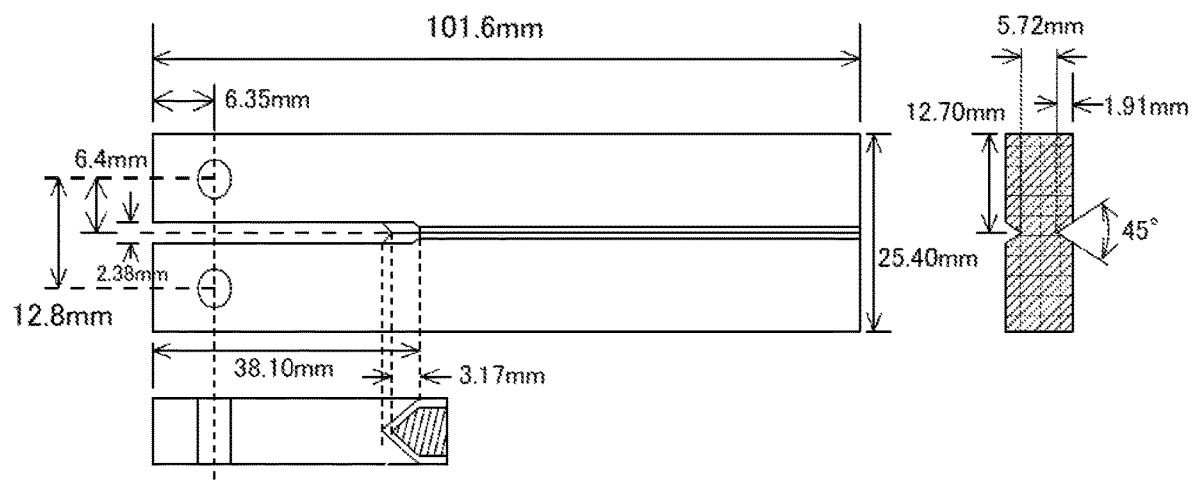
FIG. 2A shows a side view and a cross-sectional view of a DCB test specimen that is used in a DCB test in the present embodiment.
Figure 2B:
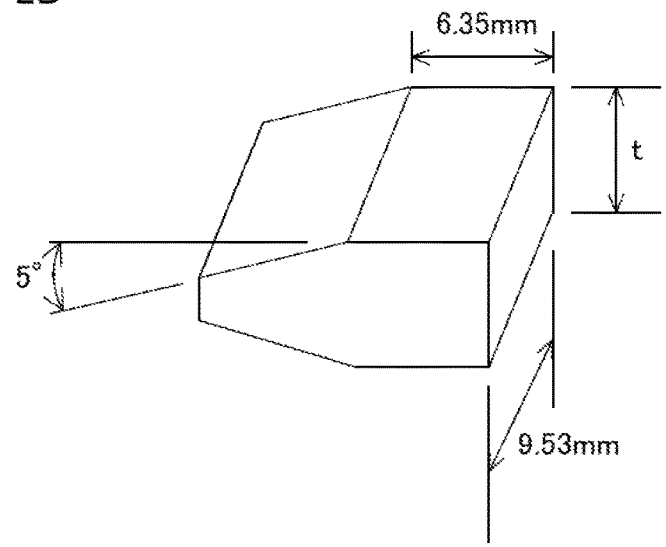
FIG. 2B is a perspective view of a wedge that is used in the DCB test in the present embodiment.

The DCB test is performed in accordance with "Method D" described in NACE TM0177-2005. Specifically, a mixed aqueous solution containing 5.0 mass % of sodium chloride and 0.5 mass % of acetic acid (NACE solution A) is employed as the test solution. A DCB test specimen illustrated in FIG. 2A is taken from the steel material according to the present embodiment. In a case where the steel material is a steel plate, the test specimen is taken from a center portion of the thickness. In a case where the steel material is a steel pipe, the test specimen is taken from a center portion of the wall thickness. The longitudinal direction of the DCB test specimen is parallel with the rolling direction of the steel material. A wedge illustrated in FIG. 2B is also taken from the steel material according to the present embodiment. A thickness t of the wedge is made 3.12 (mm).

Referring to FIG. 2A, the aforementioned wedge is driven in between the arms of the DCB test specimen. The DCB test specimen into which the wedge was driven is then enclosed inside a test vessel. Thereafter, the aforementioned test solution is poured into the test vessel so as to leave a vapor phase portion, and is adopted as the test bath. After the test bath is degassed, 1 atm $H_2S$ gas is blown into the test vessel to make the test bath a corrosive environment. The inside of the test vessel is held at a temperature of 24° C. for two weeks (336 hours) while stirring the test bath. After being held for two weeks, the DCB test specimen is taken out from the test vessel.

A pin is inserted into a hole formed in the tip of the arms of each DCB test specimen that is taken out and a notch portion is opened with a tensile testing machine, and a wedge releasing stress P is measured. In addition, the notch in the DCB test specimen is released in liquid nitrogen, and a crack propagation length "a" with respect to crack propagation that occurred during immersion is measured. The crack propagation length "a" is measured visually using vernier calipers. A fracture toughness value $K_{ISSC}$ (MPa√m) is determined using Formula (8) based on the obtained wedge releasing stress P and the crack propagation length "a".

$$K_{ISSC} = \frac{Pa\left(2\sqrt{3} + 2.38\frac{h}{a}\right)\left(\frac{B}{Bn}\right)^{\frac{1}{\sqrt{3}}}}{Bh^{\frac{3}{2}}} \quad (8)$$

In Formula (8), h represents the height (mm) of each arm of the DCB test specimen, B represents the thickness (mm) of the DCB test specimen, and Bn represents the web thickness (mm) of the DCB test specimen. These are defined in "Method D" of NACE TM0177-2005.

The low temperature SSC resistance test is performed in accordance with "Method A" described in NACE TM177-2005. Round bar test specimens are taken from the steel material according to the present embodiment. In a case where the steel material is a steel plate, the round bar test specimens are taken from a center portion of the thickness. In a case where the steel material is a steel pipe, the round bar test specimens are taken from a center portion of the wall thickness. The size of the round bar test specimen is, for example, 6.35 mm in diameter, with a parallel portion length of 25.4 mm. The axial direction of the round bar test specimen is parallel to the rolling direction of the steel material.

A mixed aqueous solution containing 5.0 mass % of sodium chloride and 0.5 mass % of acetic acid (NACE solution A) is employed as the test solution. A stress equivalent to 95% of the actual yield stress is applied to the round bar test specimen. The test solution at 4° C. is poured into a test vessel so that the round bar test specimen to which the stress has been applied is immersed therein, and this is adopted as a test bath. After degassing the test bath, 1 atm $H_2S$ gas is blown into the test bath and is caused to saturate in the test bath. The test bath into which 1 atm $H_2S$ gas was blown is held for 720 hours (30 days) at 4° C.

In the steel material according to the present embodiment, in a case where the yield strength of the steel material is of 95 ksi grade, the fracture toughness value $K_{ISSC}$ of determined under the foregoing DCB test is 42.0 MPa√m or more, and cracking is not confined after 720 hours (30 days) elapses at the condition under the foregoing low temperature SSC resistance test.

[SSC Resistance when Yield Strength is 110 Ksi Grade]

In a case where the yield strength of the steel material is of 110 ksi grade, the SSC resistance of the steel material can be evaluated by a DCB test performed in accordance with "Method D" described in NACE TM0177-2005. The DCB test is performed in a similar manner to the aforementioned DCB test that is performed when the yield strength is of 95 ksi grade except that the thickness t of the wedge is made 2.92 (mm).

In the steel material according to the present embodiment, when the yield strength of the steel material is of 110 ksi grade, the fracture toughness value $K_{ISSC}$ of determined under the foregoing DCB test is 27.5 MPa√m or more.

[Production Method]

A method for producing the steel material according to the present embodiment will now be described. The production method described hereunder is a method for producing a seamless steel pipe as one example of the steel material according to the present embodiment. The method for producing a seamless steel pipe includes a process of preparing a hollow shell (preparation process), and a process of subjecting the hollow shell to quenching and tempering to obtain a seamless steel pipe (quenching process and tempering process). Note that, a method for producing the steel material according to the present embodiment is not limited to the production method described hereunder. Each of these processes is described in detail hereunder.

[Preparation Process]

In the preparation process, an intermediate steel material containing the aforementioned chemical composition is prepared. The method is not particularly limited as long as the intermediate steel material contains the aforementioned chemical composition. As used here, the term "intermediate steel material" refers to a plate-shaped steel material in a case where the end product is a steel plate, and refers to a hollow shell in a case where the end product is a steel pipe.

The preparation process may include a process in which a starting material is prepared (starting material preparation process), and a process in which the starting material is subjected to hot working to produce an intermediate steel material (hot working process). Hereunder, a case in which the preparation process includes the starting material preparation process and the hot working process is described in detail.

[Starting Material Preparation Process]

In the starting material preparation process, a starting material is produced using molten steel containing the aforementioned chemical composition. The method for producing the starting material is not particularly limited, and a well-known method can be used. Specifically, a cast piece (a slab, bloom or billet) is produced by a continuous casting process using the molten steel. An ingot may also be produced by an ingot-making process using the molten steel. As necessary, the slab, bloom or ingot may be subjected to blooming to produce a billet. The starting material (a slab, bloom or billet) is produced by the above described process.

[Hot Working Process]

In the hot working process, the starting material that was prepared is subjected to hot working to produce an intermediate steel material. In a case where the steel material is a seamless steel pipe, the intermediate steel material corresponds to a hollow shell. First, the billet is heated in a heating furnace. Although the heating temperature is not particularly limited, for example, the heating temperature is within a range of 1100 to 1300° C. The billet that is extracted from the heating furnace is subjected to hot working to produce a hollow shell (seamless steel pipe). The method of performing the hot working is not particularly limited, and a well-known method can be used.

For example, the Mannesmann process may be performed as the hot working to produce the hollow shell. In this case, a round billet is piercing-rolled using a piercing machine. When performing piercing-rolling, although the piercing ratio is not particularly limited, the piercing ratio is, for example, within a range of 1.0 to 4.0. The round billet that underwent piercing-rolling is further hot-rolled to form a hollow shell using a mandrel mill, a reducer, a sizing mill or the like. The cumulative reduction of area in the hot working process is, for example, 20 to 70%.

A hollow shell may also be produced from the billet by another hot working method. For example, in the case of a heavy-wall steel material of a short length such as a coupling, a hollow shell may be produced by forging such as Ehrhardt process. A hollow shell is produced by the above process. Although not particularly limited, the wall thickness of the hollow shell is, for example, 9 to 60 mm.

The hollow shell produced by hot working may be air-cooled (as-rolled). The hollow shell produced by hot working may be subjected to direct quenching after hot working without being cooled to normal temperature, or may be subjected to quenching after undergoing supplementary heating (reheating) after hot working.

In a case of performing direct quenching or quenching after supplementary heating, it is preferable to stop the cooling midway through the quenching process and conduct slow cooling. In this case, quenching cracking can be suppressed. In a case where direct quenching is performed after hot working, or quenching is performed after supplementary heating after hot working, a stress relief treatment (SR treatment) may be performed at a time that is after quenching and before the heat treatment of the next process. In this case, residual stress of the hollow shell can be eliminated.

As described above, an intermediate steel material is prepared in the preparation process. The intermediate steel material may be produced by the aforementioned preferable process, or may be an intermediate steel material that was produced by a third party, or an intermediate steel material that was produced in another factory other than the factory in which a quenching process and a tempering process that are described later are performed, or at a different works. The quenching process is described in detail hereunder.

[Quenching Process]

In the quenching process, the intermediate steel material (hollow shell) that was prepared is subjected to quenching. In the present description, the term "quenching" means rapidly cooling the intermediate steel material that is at a temperature not less than the $A_3$ point. A preferable quenching temperature is 850 to 1000° C. In a case where direct quenching is performed after hot working, the quenching temperature corresponds to the surface temperature of the intermediate steel material that is measured by a thermometer placed on the exit side of the apparatus that performs the final hot working. Further, in a case where quenching is performed after supplementary heating is performed after hot working, the quenching temperature corresponds to the temperature of the furnace that performs the supplementary heating.

If the quenching temperature is too high, in some cases prior-γ grains become coarse and the SSC resistance of the steel material decreases. Therefore, a quenching temperature in the range of 850 to 1000° C. is preferable.

The quenching method, for example, continuously cools the intermediate steel material (hollow shell) from the quenching starting temperature, and continuously decreases the surface temperature of the hollow shell. The method of performing the continuous cooling treatment is not particularly limited, and a well-known method can be used. The method of performing the continuous cooling treatment is, for example, a method that cools the hollow shell by immersing the hollow shell in a water bath, or a method that cools the hollow shell in an accelerated manner by shower water cooling or mist cooling.

If the cooling rate during quenching is too slow, the microstructure does not become one that is principally composed of martensite and bainite, and the mechanical property defined in the present embodiment (that is, the yield strength of 95 ksi grade or 110 ksi grade, and the yield ratio of 85% or more) is not obtained.

Therefore, as described above, in the method for producing the steel material according to the present embodiment, the intermediate steel material is rapidly cooled during quenching. Specifically, in the quenching process, the average cooling rate when the surface temperature of the intermediate steel material (hollow shell) is within the range of 800 to 500° C. during quenching is defined as a cooling rate during quenching $CR_{800-500}$. More specifically, the cooling rate during quenching $CR_{800-500}$ is determined based on a temperature that is measured at a region that is most slowly cooled within a cross-section of the intermediate steel material that is being quenched (for example, in the case of forcedly cooling both surfaces, the cooling rate is measured at the center portion of the thickness of the intermediate steel material).

A preferable of the cooling rate during quenching $CR_{800-500}$ is 300° C./min or higher. A more preferable lower limit of the cooling rate during quenching $CR_{800-500}$ is 450° C./min, and further preferably is 600° C./min. Although an upper limit of the cooling rate during quenching $CR_{800-500}$ is not particularly defined, for example, the upper limit is 60000° C./min.

Preferably, quenching is performed after performing heating of the hollow shell in the austenite zone a plurality of times. In this case, the SSC resistance of the steel material increases because austenite grains are refined prior to quenching. Heating in the austenite zone may be repeated a plurality of times by performing quenching a plurality of times, or heating in the austenite zone may be repeated a plurality of times by performing normalizing and quenching. Quenching and tempering described below may be performed in combination a plurality of times. Therefore, both quenching and tempering may be performed a plurality of times. In this case, the SSC resistance of the steel material further increases. Hereunder, the tempering process will be described in detail.

[Tempering Process]

In the tempering process, tempering is performed after performing the aforementioned quenching. In the present description, the term "tempering" means reheating the intermediate steel material after quenching to a temperature that is not more than the Ai point and holding the intermediate steel material at that temperature. The tempering temperature is appropriately adjusted in accordance with the chemical composition of the steel material and the yield strength, which is to be obtained. Here, the tempering temperature corresponds to the temperature of the furnace when the intermediate steel material after quenching is heated and held at the relevant temperature.

That is, in the tempering process according to the present embodiment, with respect to the intermediate steel material (hollow shell) containing the aforementioned chemical composition, the tempering temperature is adjusted so as to adjust the yield strength of the steel material to within a range of 655 to less than 862 MPa (95 ksi grade or 110 ksi grade). Hereunder, in a case where it is intended to obtain a yield strength of 95 ksi grade and 110 ksi grade, the tempering temperature is described in detail.

[Tempering Temperature when Yield Strength is 95 Ksi Grade]

When it is intended to obtain a yield strength of 95 ksi grade (655 to less than 758 MPa), a preferable tempering temperature is in a range from 650 to 740° C. If the tempering temperature is too high, in some cases the dislocation density is reduced too much and a yield strength of 95 ksi grade cannot be obtained. In contrast, if the tempering temperature is too low, in some cases the dislocation density cannot be adequately reduced. In such cases, the yield strength of the steel material becomes too high and/or the SSC resistance of the steel material decreases.

Accordingly, in a case where it is intended to obtain a yield strength of 95 ksi grade, it is preferable to set the tempering temperature within the range of 650 to 740° C. When it is intended to obtain a yield strength of 95 ksi grade, a more preferable lower limit of the tempering temperature is 670° C., and further preferably is 680° C. When it is intended to obtain a yield strength of 95 ksi grade, a more preferable upper limit of the tempering temperature is 730° C. and further preferably is 720° C.

[Tempering Temperature when Yield Strength is 110 Ksi Grade]

When it is intended to obtain a yield strength of 110 ksi grade (758 to less than 862 MPa), a preferable tempering temperature is in a range from 650 to 720° C. If the tempering temperature is too high, in some cases the dislocation density is reduced too much and a yield strength of 110 ksi grade cannot be obtained. In contrast, if the tempering temperature is too low, in some cases the dislocation density cannot be adequately reduced. In such cases, the yield strength of the steel material becomes too high and/or the SSC resistance of the steel material decreases.

Accordingly, in a case where it is intended to obtain a yield strength of 110 ksi grade, it is preferable to set the tempering temperature within the range of 650 to 720° C. When it is intended to obtain a yield strength of 110 ksi grade, a more preferable lower limit of the tempering temperature is 660° C., and further preferably is 670° C. When it is intended to obtain a yield strength of 110 ksi grade, a more preferable upper limit of the tempering temperature is 715° C. and further preferably is 710° C.

As described above, in the tempering process according to the present embodiment, the tempering temperature is appropriately controlled in accordance with the yield strength which it is intended to obtain (95 ksi grade and 110 ksi grade). A person skilled in the art will be sufficiently capable of making the yield strength of the steel material containing the aforementioned chemical composition fall within the intended range by appropriately adjusting the undermentioned holding time at the aforementioned tempering temperature.

In the tempering process according to the present embodiment, a preferable holding time (tempering time) is within the range of 10 to 180 minutes. Here, the tempering time (holding time) means the period of time from the loading of the intermediate steel material into the heat treatment furnace till the extracting.

If the tempering time is too short, the amount of dissolved C becomes excessive because precipitation of carbides does not proceed. Even if the tempering time is overlong, there will be almost no change in the amount of dissolved C. Therefore, in order to control the amount of dissolved C to be within an appropriate range, the preferable tempering time is within a range of 10 to 180 minutes.

A more preferable lower limit of the tempering time is 15 minutes. A more preferable upper limit of the tempering time is 120 minutes, and further preferably is 90 minutes. Note that, in a case where the steel material is a steel pipe, in comparison to other shapes, temperature variations with respect to the steel pipe are liable to occur during holding for tempering. Therefore, in a case where the steel material is a steel pipe, the tempering time is preferably set within a range of 15 to 180 minutes.

[Regarding Rapid Cooling after Tempering]

Conventionally, cooling after tempering has not been controlled. However, the temperature region from 600° C. to 200° C. is a temperature region in which diffusion of C is comparatively fast. Therefore, if the cooling rate of the steel material after tempering (that is, after being held for the aforementioned holding time at the aforementioned tempering temperature) is slow, almost all of the C that had dissolved will reprecipitate while the temperature is decreasing. In other words, the amount of dissolved C will be approximately 0 mass %. Therefore, in the present embodiment, the intermediate steel material (hollow shell) after tempering is rapidly cooled.

Specifically, in the tempering process, the average cooling rate when the temperature of the intermediate steel material (hollow shell) is within the range of 600 to 200° C. after tempering is defined as a cooling rate after tempering $CR_{600-200}$ In the method for producing the steel material according to the present embodiment, the cooling rate after tempering $CR_{600-200}$ is preferably 5° C./sec or higher. On the other hand, if the cooling rate after tempering is too fast, in some cases very little of the C that had dissolved will precipitate, and the amount of dissolved C will be excessive. In such a case, the SSC resistance of the steel material decreases.

Therefore, in the present description, the preferable cooling rate after tempering $CR_{600-200}$ is within the range of 5 to 100° C./sec. A more preferable lower limit of the cooling rate after tempering $CR_{600-200}$ is 10° C./sec, and further preferably is 15° C./sec. A more preferable upper limit of the cooling rate after tempering $CR_{600-200}$ is 50° C./sec. and further preferably is 40° C./sec. Note that, in the case when the tempering is performed a plurality of times, it may be controlled the cooling after the final tempering. That is, the cooling after the tempering except for the final tempering may be performed as same as conventional manner.

A method for cooling so that the cooling rate after tempering $CR_{600-200}$ is within the range of 5 to 100° C./sec is not particularly limited, and a well-known method can be used. The cooling method, for example, is a method that performs forced cooling of a hollow shell continuously from the tempering temperature to thereby continuously decrease the surface temperature of the hollow shell. Examples of this kind of continuous cooling treatment include a method that cools the hollow shell by immersion in a water bath, and a method that cools the hollow shell in an accelerated manner by shower water cooling, mist cooling or forced air cooling. Note that, the cooling rate after tempering $CR_{600-200}$ is measured at a region that is most slowly cooled within a cross-section of the intermediate steel material that is tempered (for example, in the case of forcedly cooling both surfaces, the cooling rate is measured at the center portion of the thickness of the intermediate steel material).

The steel material according to the present embodiment can be produced by the production method that is described above. A method for producing a seamless steel pipe has been described as one example of the aforementioned production method. However, the steel material according to the present embodiment may be a steel plate or another shape. An example of a method for producing a steel plate or a steel material of another shape also includes, for example, a preparation process, a quenching process and a tempering process, similarly to the production method described above. However, the aforementioned production method is one example, and the steel material according to the present embodiment may be produced by another production method.

Hereunder, the present invention is described more specifically by way of examples.

Example 1

In Example 1, the SSC resistance of a steel material having a yield strength of 95 ksi grade (655 to less than 758 MPa) was investigated. Specifically, molten steels having the chemical compositions shown in Table 1 were produced.

TABLE 1

| Test Number | Chemical Composition (Unit is mass %; balance is Fe and impurities) | | | | | | | | | | |
|---|---|---|---|---|---|---|---|---|---|---|---|
| | C | Si | Mn | P | S | Al | Cr | Mo | Ti | N | O | B |
| 1-A | 0.24 | 0.29 | 0.82 | 0.006 | 0.0030 | 0.026 | 1.00 | 0.25 | 0.008 | 0.0039 | 0.0017 | — |
| 1-B | 0.26 | 0.23 | 0.42 | 0.008 | 0.0030 | 0.037 | 1.02 | 0.45 | 0.026 | 0.0033 | 0.0013 | 0.0011 |
| 1-C | 0.27 | 0.30 | 0.45 | 0.005 | 0.0020 | 0.037 | 0.50 | 1.20 | 0.007 | 0.0032 | 0.0014 | 0.0011 |

TABLE 1-continued

| | | | | | | | | | | | | |
|---|---|---|---|---|---|---|---|---|---|---|---|---|
| 1-D | 0.24 | 0.28 | 0.26 | 0.001 | 0.0024 | 0.030 | 0.87 | 1.25 | 0.002 | 0.0040 | 0.0015 | — |
| 1-E | 0.28 | 0.24 | 0.60 | 0.003 | 0.0027 | 0.042 | 0.90 | 0.84 | 0.008 | 0.0045 | 0.0013 | — |
| 1-F | 0.27 | 0.33 | 0.17 | 0.013 | 0.0021 | 0.020 | 0.97 | 0.80 | 0.023 | 0.0035 | 0.0014 | 0.0012 |
| 1-G | 0.24 | 0.33 | 0.67 | 0.015 | 0.0029 | 0.040 | 1.03 | 0.72 | 0.005 | 0.0015 | 0.0012 | — |
| 1-H | 0.28 | 0.26 | 0.15 | 0.012 | 0.0019 | 0.040 | 0.96 | 0.96 | 0.011 | 0.0032 | 0.0031 | — |
| 1-I | 0.28 | 0.30 | 0.52 | 0.002 | 0.0028 | 0.030 | 0.85 | 0.66 | 0.021 | 0 0015 | 0.0012 | — |
| 1-J | 0.27 | 0.34 | 0.77 | 0.003 | 0.0023 | 0.040 | 1.04 | 0.83 | 0.006 | 0.0025 | 0.0012 | — |
| 1-K | 0.24 | 0.34 | 0.63 | 0.014 | 0.0025 | 0.030 | 0.99 | 1.21 | 0.004 | 0.0025 | 0.0013 | — |
| 1-L | 0.28 | 0.34 | 0.26 | 0.015 | 0.0019 | 0.030 | 1.03 | 0.84 | 0.017 | 0.0038 | 0.0014 | — |
| 1-M | 0.26 | 0.22 | 0.44 | 0.012 | 0.0004 | 0.036 | 1.05 | 0.47 | 0.027 | 0.0041 | 0.0013 | 0.0012 |
| 1-N | 0.27 | 0.30 | 0.42 | 0.007 | 0.0011 | 0.040 | 1.04 | 0.71 | 0.006 | 0.0019 | 0.0010 | 0.0013 |
| 1-O | 0.27 | 0.29 | 0.46 | 0.001 | 0.0015 | 0.040 | 0.97 | 1.15 | 0.002 | 0.0025 | 0.0012 | — |
| 1-P | 0.28 | 0.23 | 0.56 | 0.002 | 0.0012 | 0.030 | 0.98 | 1.20 | 0.006 | 0.0025 | 0.0015 | — |
| 1-Q | 0.27 | 0.25 | 0.94 | 0.011 | 0.0022 | 0.026 | 0.52 | 0.20 | 0.006 | 0.0032 | 0.0014 | — |

| Test Number | Chemical Composition (Unit is mass %; balance is Fe and impurities) | | | | | | | | |
|---|---|---|---|---|---|---|---|---|---|
| | V | Nb | Ca | Mg | Zr | REM | Co | W | Cu | Ni |
| 1-A | — | — | — | — | — | — | — | — | — | — |
| 1-B | 0.10 | 0.027 | 0.0013 | — | — | — | — | — | — | — |
| 1-C | 0.10 | 0.030 | 0.0014 | — | — | — | — | — | — | — |
| 1-D | 0.10 | 0.027 | — | — | — | — | — | — | — | — |
| 1-E | — | 0.031 | — | — | — | — | — | — | — | — |
| 1-F | — | 0.027 | — | — | — | — | — | — | — | — |
| 1-G | — | 0.025 | 0.0012 | — | — | — | — | — | — | — |
| 1-H | — | 0.025 | — | 0.0013 | — | — | — | — | — | — |
| 1-I | — | 0.027 | — | — | 0.0010 | — | — | — | — | — |
| 1-J | — | 0.027 | — | — | — | 0.0012 | — | — | — | — |
| 1-K | 0.09 | 0.027 | — | — | — | — | 0.50 | — | — | — |
| 1-L | — | 0.027 | — | — | — | — | — | 0.50 | — | — |
| 1-M | — | 0.027 | — | 0.0030 | — | — | — | — | 0.02 | — |
| 1-N | 0.10 | 0.030 | — | — | — | 0.0012 | 0.10 | — | — | 0.03 |
| 1-O | 0.09 | 0.025 | — | — | — | — | — | — | 0.03 | — |
| 1-P | 0.09 | 0.025 | — | — | — | — | — | — | — | 0.03 |
| 1-Q | — | 0.027 | 0.0013 | — | — | — | — | — | — | — |

A billet having an outer diameter of 310 mm was produced using the aforementioned molten steel. The produced billet was heated to 1250° C., and then the billet was hot rolled to produce a seamless steel pipe having an outer diameter of 244.48 mm and a wall thickness of 13.84 mm. A sample material having a thickness of 13.84 mm in a plate shape was taken from the produced seamless steel pipe such that the sample material has a size enough for taking out specimens for use in evaluation tests, which will be described later.

The obtained the sample material of each test number was subjected to quenching and tempering. Specifically, the quenching and tempering were performed once on the sample materials of test numbers excluding the Test Numbers 1-16 and 1-25. On the sample materials of the Test Numbers 1-16 and 1-25, the quenching and tempering were repeated twice.

In more specific terms, the sample materials of test numbers excluding the Test Numbers 1-16 and 1-25 were held at a quenching temperature of 920° C. for 30 minutes. After being held, the sample materials of test numbers excluding the Test Numbers 1-16 and 1-25 were immersed in a water bath for water cooling. At this time, the cooling rate during quenching ($CR_{800-500}$) was 300° C./min. The quenching temperature was set to the temperature of the furnace that performed the heating of quenching. The cooling rate during quenching ($CR_{800-500}$) was determined from the temperature that was measured by a type K thermocouple of a sheath type being inserted into a center portion of the sample material in advance.

After quenching, the sample materials of test numbers excluding the Test Numbers 16 and 25 were subjected to tempering. For the tempering, a tempering temperature was adjusted such that the yield strength of 95 ksi grade (655 to less than 758 MPa) was achieved. Specifically, in the tempering performed on the sample materials of test numbers excluding the Test Numbers 1-16 and 1-25, the tempering temperature (° C.) and the tempering time (min) were as shown in Table 2.

After performing the heat treatment at the respective tempering temperatures, the sample materials of test numbers excluding the Test Numbers 1-16 and 1-25 were cooled. For the cooling, the sample materials were subjected to a controlled cooling by mist water cooling. The tempering temperature was set to the temperature of the furnace that performed the tempering. The cooling rate after tempering ($CR_{600-200}$) was determined from the temperature that was measured by a type K thermocouple of a sheath type being inserted into a center portion of the sample material in advance. In the tempering performed on the sample materials of test numbers excluding the Test Numbers 1-16 and 1-25, the cooling rate after tempering ($CR_{600-200}$)(° C./sec) was as shown in Table 2.

On the sample materials of the Test Numbers 1-16 and 1-25, the quenching and tempering were repeated twice as described above. The sample materials of the Test Numbers 1-16 and 1-25 were held at a quenching temperature of 920° C. for 10 minutes. The sample materials of the Test Numbers 1-16 and 1-25 after being held were immersed in a water bath for water cooling. At this time, the cooling rate during first quenching ($CR_{800-500}$) was 300° C./min. The sample materials of the Test Numbers 1-16 and 1-25 subjected to quenching were held at a tempering temperature of 700° C. for 30 minutes of tempering time. The sample materials of the Test Numbers 1-16 and 1-25 after being held were allowed to cool to a normal temperature.

After performing the first quenching and tempering, the sample materials of the Test Numbers 1-16 and 1-25 were subjected to the second quenching. Specifically, the sample materials of the Test Numbers 1-16 and 1-25 were held at a quenching temperature of 900° C. for 30 minutes. The sample materials of the Test Numbers 1-16 and 1-25 after being held were immersed in a water bath for water cooling. At this time, the cooling rate during second quenching ($CR_{800-500}$) was 300° C./min.

For the second tempering, as with the case of the sample materials of test numbers excluding the Test Numbers 1-16 and 1-25, the tempering temperature was adjusted such that the yield strength of 95 ksi grade (655 to less than 758 MPa) was achieved. Specifically, in the second tempering performed on the sample materials of the Test Numbers 1-16 and 1-25, the tempering temperature (° C.) and the tempering time (min) were as shown in Table 2.

After being subjected to the tempering, the sample materials of the Test Numbers 1-16 and 1-25 were cooled. For the cooling, the sample materials were subjected to a controlled cooling by mist water cooling. The cooling rate after tempering ($CR_{600-200}$)(° C./sec) of the sample materials of the Test Numbers 1-16 and 1-25 was as shown in Table 2. For the sample materials of the Test Numbers 1-16 and 1-25, the temperature of the furnace that performed the heating of quenching was also used for the quenching temperature. Similarly, the temperature of the furnace that performed the tempering was also used for the tempering temperature. Further, the cooling rates during first and second quenching ($CR_{800-500}$) were determined from the temperature that was measured by a type K thermocouple of a sheath type being inserted into a center portion of the sample material in advance. Similarly, the cooling rates after first and second tempering ($CR_{600-200}$) were determined from the temperature that was measured by a type K thermocouple of a sheath type being inserted into a center portion of the sample material in advance.

Evaluation Results

A tensile test, microstructure determination test, amount of dissolved C measurement test, a dislocation density measurement test. DCB test and low temperature SSC resistance test described hereunder were performed on the sample materials of each test number after the aforementioned tempering.

[Tensile Test]

A tensile test was performed in accordance with ASTM E8(2013). Round bar tensile test specimens having a diameter of 6.35 mm and a parallel portion length of 35 mm were taken from the center portion of the thickness of the sample materials of each test number. The axial direction of each of the round bar test specimens was parallel to the rolling direction of the sample material (the axial direction of the seamless steel pipe). A tensile test was performed in the atmosphere at normal temperature (25° C.) using each test number of round bar test specimens, and the yield strength (MPa) and tensile strength (MPa) were obtained. Note that, in the present example, the stress at the time of 0.5% elongation (0.5% yield stress) obtained in the tensile test defined as the yield strength for each test number. Further, the largest stress during uniform elongation was taken as the tensile strength. A ratio of the yield strength to the tensile strength (YS/TS) was adopted as the yield ratio (%). The determined yield strength (YS), tensile strength (TS) and yield ratio (YR) are shown in Table 2.

[Microstructure Determination Test]

With respect to the microstructures of the sample materials of each test number, when the yield strength was in a range of 655 to less than 758 MPa (95 ksi grade) and the yield ratio was 85% or more, it was determined that the volume ratios of tempered martensite and tempered bainite was 90% or more. In the microstructure of the sample

TABLE 2

| Test Number | Steel | Tempering Temperature (° C.) | Tempering Time (min) | $CR_{600-200}$ (° C./sec) | YS (MPa) | TS (MPa) | YR (%) | Dissolved C Amount (mass %) | Dislocation Density ($\times 10^{14} \times m^{-2}$) | Low temperature SSC resistant test | $K_{ISSC}$ (MPa√m) 1 | 2 | 3 | Average Value |
|---|---|---|---|---|---|---|---|---|---|---|---|---|---|---|
| 1-1 | 1-A | 660 | 60 | 19.0 | 747 | 858 | 87 | 0.026 | 4.1 | E | 48.1 | 47.3 | 44.1 | 46.5 |
| 1-2 | 1-A | 680 | 60 | 19.2 | 685 | 809 | 85 | 0.029 | 3.8 | E | 47.9 | 42.9 | 43.5 | 44.8 |
| 1-3 | 1-B | 690 | 60 | 19.8 | 746 | 853 | 88 | 0.026 | 4.1 | E | 43.8 | 50.0 | 46.9 | 46.9 |
| 1-4 | 1-C | 710 | 60 | 19.7 | 756 | 844 | 90 | 0.037 | 4.3 | E | 42.4 | 42.9 | 44.5 | 43.3 |
| 1-5 | 1-D | 720 | 30 | 22.0 | 699 | 794 | 88 | 0.011 | 3.9 | E | 49.0 | 45.6 | 42.0 | 45.5 |
| 1-6 | 1-E | 710 | 60 | 25.0 | 689 | 807 | 85 | 0.027 | 3.7 | E | 43.4 | 46.8 | 47.9 | 46.0 |
| 1-7 | 1-F | 710 | 60 | 18.4 | 695 | 800 | 87 | 0.033 | 3.8 | E | 48.6 | 47.2 | 48.1 | 48.0 |
| 1-8 | 1-G | 710 | 60 | 19.6 | 693 | 796 | 87 | 0.015 | 3.6 | E | 47.0 | 42.5 | 46.5 | 45.3 |
| 1-9 | 1-H | 710 | 60 | 20.1 | 693 | 793 | 87 | 0.034 | 3.5 | E | 46.7 | 49.5 | 46.5 | 47.6 |
| 1-10 | 1-I | 710 | 60 | 21.5 | 683 | 793 | 86 | 0.039 | 3.4 | E | 42.2 | 46.6 | 42.0 | 43.6 |
| 1-11 | 1-J | 710 | 60 | 34.9 | 692 | 791 | 88 | 0.035 | 3.5 | E | 43.6 | 47.7 | 47.6 | 46.3 |
| 1-12 | 1-K | 720 | 30 | 19.2 | 697 | 808 | 86 | 0.015 | 3.6 | E | 42.3 | 45.7 | 44.1 | 44.0 |
| 1-13 | 1-L | 700 | 60 | 32.4 | 688 | 803 | 86 | 0.044 | 3.3 | E | 48.7 | 45.3 | 43.2 | 45.7 |
| 1-14 | 1-M | 700 | 30 | 20.1 | 692 | 788 | 88 | 0.026 | 3.6 | E | 51.9 | 48.9 | 45.4 | 48.7 |
| 1-15 | 1-M | 710 | 30 | 19.8 | 665 | 763 | 87 | 0.018 | 3.1 | E | 53.5 | 48.7 | 50.9 | 51.0 |
| 1-16 | 1-N | 730 | 30 | 20.1 | 659 | 712 | 93 | 0.039 | 2.7 | E | 49.6 | 48.6 | 52.0 | 50.0 |
| 1-17 | 1-O | 720 | 30 | 34.9 | 695 | 806 | 86 | 0.044 | 3.7 | E | 48.8 | 42.2 | 44.9 | 45.3 |
| 1-18 | 1-P | 720 | 30 | 36.4 | 681 | 790 | 86 | 0.029 | 3.5 | E | 50.0 | 43.0 | 50.0 | 47.7 |
| 1-19 | 1-A | 670 | 60 | 0.05 | 729 | 847 | 86 | 0.008 | 4.0 | NA | 32.3 | 35.1 | 37.8 | 35.1 |
| 1-20 | 1-A | 680 | 60 | 0.05 | 680 | 802 | 85 | 0.002 | 3.4 | NA | 35.1 | 31.9 | 35.9 | 34.3 |
| 1-21 | 1-B | 690 | 60 | 0.10 | 742 | 860 | 86 | 0.008 | 4.3 | NA | 31.8 | 31.8 | 30.0 | 31.2 |
| 1-22 | 1-C | 710 | 60 | 0.10 | 756 | 847 | 89 | 0.003 | 4.2 | NA | 38.3 | 32.3 | 32.5 | 34.4 |
| 1-23 | 1-M | 700 | 30 | 0.10 | 693 | 793 | 87 | 0.006 | 3.6 | NA | 38.3 | 39.5 | 40.1 | 39.3 |
| 1-24 | 1-M | 710 | 30 | 0.40 | 667 | 760 | 88 | 0.008 | 3.2 | NA | 40.9 | 40.1 | 40.1 | 40.4 |
| 1-25 | 1-N | 730 | 30 | 0.50 | 658 | 725 | 91 | 0.005 | 3.1 | NA | 37.6 | 39.7 | 39.7 | 39.0 |
| 1-26 | 1-A | 680 | 60 | 110 | 687 | 812 | 85 | 0.054 | 3.5 | NA | 35.8 | 34.5 | 35.1 | 35.1 |
| 1-27 | 1-Q | 650 | 60 | 18.4 | 742 | 887 | 84 | 0.012 | 4.5 | NA | 30.6 | 34.8 | 30.5 | 32.0 | materials of test numbers excluding the Test Number 1-27, the volume ratios of tempered martensite and tempered bainite was 90% or more.

[Amount of Dissolved C Measurement Test]

With respect to the sample materials of each test number, the amount of dissolved C (mass %) was measured and calculated by the measurement method described above. Note that, the TEM used was JEM-2010 manufactured by JEOL Ltd., the acceleration voltage was set to 200 kV. For the EDS point analysis the irradiation current was 2.56 nA, and measurement was performed for 60 seconds at each point. The observation regions for the TEM observation were 8 μm×8 μm, and observation was performed with respect to an arbitrary 10 visual fields. The residual amounts of each element and the concentrations of each element in cementite that were used to calculate the amount of dissolved C were as listed in Table 3.

number. A thickness t of the wedge was 3.12 mm. The aforementioned wedge was driven in between the arms of the DCB test specimen.

A mixed aqueous solution containing 5.0 mass % of sodium chloride and 0.5 mass % of acetic acid (NACE solution A) was used as the test solution. The test solution was poured into the test vessel enclosing the DCB test specimen into which the wedge had been driven inside so as to leave a vapor phase portion, and was adopted as the test bath. After the test bath was degassed, 1 atm $H_2S$ gas was blown into the test vessel to make the test bath a corrosive environment. The inside of the test vessel was held at a temperature of 24° C. for two weeks (336 hours) while stirring the test bath. After being held for two weeks, the DCB test specimen was taken out from the test vessel.

A pin was inserted into a hole formed in the tip of the arms of each DCB test specimen that was taken out and a notch portion was opened with a tensile testing machine, and a

TABLE 3

| Test Number | Steel | Residual Amount (mass %) | | | | | | Concentration in Cementite (mass %) | | | | Dissolved C Amount (mass %) |
|---|---|---|---|---|---|---|---|---|---|---|---|---|
| | | Fe | Cr | Mn | Mo | V | Nb | Fe | Cr | Mn | Mo | |
| 1-1 | 1-A | 2.2 | 0.46 | 0.11 | 0.21 | — | — | 83.1 | 8.4 | 3.1 | 5.4 | 0.026 |
| 1-2 | 1-A | 2.2 | 0.48 | 0.10 | 0.19 | — | — | 80.8 | 10.8 | 2.5 | 5.9 | 0.029 |
| 1-3 | 1-B | 2.3 | 0.37 | 0.10 | 0.24 | 0.065 | 0.027 | 82.7 | 8.5 | 2.6 | 6.1 | 0.026 |
| 1-4 | 1-C | 2.2 | 0.23 | 0.10 | 0.36 | 0.065 | 0.023 | 81.5 | 10.4 | 2.5 | 5.7 | 0.037 |
| 1-5 | 1-D | 2.1 | 0.47 | 0.11 | 0.21 | 0.071 | 0.021 | 84.8 | 7.7 | 2.7 | 4.8 | 0.011 |
| 1-6 | 1-E | 2.5 | 0.42 | 0.11 | 0.35 | — | 0.021 | 83.7 | 9.0 | 2.4 | 4.9 | 0.027 |
| 1-7 | 1-F | 2.4 | 0.40 | 0.12 | 0.30 | — | 0.022 | 81.9 | 9.6 | 2.6 | 5.9 | 0.033 |
| 1-8 | 1-G | 2.0 | 0.50 | 0.15 | 0.34 | — | 0.023 | 83.8 | 7.7 | 2.7 | 5.8 | 0.015 |
| 1-9 | 1-H | 2.5 | 0:43 | 0.15 | 0.27 | — | 0.022 | 83.1 | 8.9 | 2.9 | 5.2 | 0.034 |
| 1-10 | 1-I | 2.4 | 0.49 | 0.15 | 0.27 | — | 0.022 | 84.1 | 7.3 | 2.5 | 6.1 | 0.039 |
| 1-11 | 1-J | 2.2 | 0.48 | 0.10 | 0.33 | — | 0.023 | 84.5 | 8.9 | 2.2 | 4.5 | 0.035 |
| 1-12 | 1-K | 2.0 | 0.43 | 0.12 | 0.27 | 0.071 | 0.025 | 82.5 | 8.9 | 2.6 | 6.0 | 0.015 |
| 1-13 | 1-L | 2.3 | 0.52 | 0.11 | 0.25 | — | 0.022 | 85.0 | 8.4 | 2.3 | 4.3 | 0.044 |
| 1-14 | 1-M | 2.2 | 0.50 | 0.10 | 0.33 | — | 0.023 | 81.6 | 10.4 | 2.5 | 5.6 | 0.026 |
| 1-15 | 1-M | 2.2 | 0.56 | 0.11 | 0.35 | — | 0.028 | 84.3 | 7.3 | 2.9 | 5.5 | 0.018 |
| 1-16 | 1-N | 2.1 | 0.45 | 0.11 | 0.24 | 0.061 | 0.024 | 83.3 | 10.2 | 2.4 | 4.0 | 0.039 |
| 1-17 | 1-O | 2.0 | 0.43 | 0.13 | 0.25 | 0.071 | 0.024 | 83.2 | 8.9 | 2.8 | 5.1 | 0.044 |
| 1-18 | 1-P | 2.2 | 0.47 | 0.10 | 0.36 | 0.071 | 0.024 | 82.3 | 9.5 | 2.2 | 6.0 | 0.029 |
| 1-19 | 1-A | 2.2 | 0.54 | 0.11 | 0.28 | — | — | 85.9 | 7.2 | 2.9 | 4.0 | 0.008 |
| 1-20 | 1-A | 2.3 | 0.56 | 0.11 | 0.26 | — | — | 85.8 | 7.2 | 2.9 | 4.1 | 0.002 |
| 1-21 | 1-B | 2.5 | 0.42 | 0.10 | 0.21 | 0.061 | 0.028 | 79.0 | 14.0 | 2.8 | 4.2 | 0.008 |
| 1-22 | 1-C | 2.6 | 0.23 | 0.11 | 0.39 | 0.063 | 0.024 | 83.2 | 9.9 | 2.5 | 4.4 | 0.003 |
| 1-23 | 1-M | 2.2 | 0.60 | 0.12 | 0.39 | — | 0.023 | 85.6 | 7.4 | 3.0 | 4.1 | 0.006 |
| 1-24 | 1-M | 2.2 | 0.53 | 0.11 | 0.43 | — | 0.026 | 82.4 | 11.0 | 2.1 | 4.5 | 0.008 |
| 1-25 | 1-N | 2.6 | 0.47 | 0.11 | 0.23 | 0.063 | 0.024 | 83.7 | 9.5 | 2.3 | 4.5 | 0.005 |
| 1-26 | 1-A | 2.0 | 0.46 | 0.09 | 0.12 | — | — | 80.3 | 10.1 | 3.3 | 6.3 | 0.054 |
| 1-27 | 1-Q | 2.8 | 0.44 | 0.11 | 0.15 | — | 0.021 | 86.7 | 8.5 | 2.6 | 2.0 | 0.012 |

[Dislocation Density Measurement Test]

Test specimens for use for dislocation density measurement by the aforementioned method were taken from the sample material of each test number. In addition, the dislocation density ($m^{-2}$) was determined by the aforementioned method. The determined dislocation density ($\times 10^{14} \times m^2$) is shown in Table 2.

[DCB Test]

With respect to the sample materials of each test number, a DCB test was conducted in accordance with "Method D" of NACE TM0177-2005, and the SSC resistance was evaluated. Specifically, three of the DCB test specimen illustrated in FIG. 2A were taken from a center portion of the thickness of the sample material of each test number. The DCB test specimens were taken in a manner such that the longitudinal direction of each DCB test specimen was parallel with the rolling direction of the sample material (the axial direction of the seamless steel pipe). A wedge illustrated in FIG. 2B was further taken from the sample material of each test wedge releasing stress P was measured. In addition, the notch in the DCB test specimen being immersed in the test bath was released in liquid nitrogen, and a crack propagation length "a" with respect to crack propagation that occurred during immersion was measured. The crack propagation length "a" could be measured visually using vernier calipers. A fracture toughness value $K_{ISSC}$ (MPa√m) was determined using Formula (8) based on the obtained wedge releasing stress P and the crack propagation length "a". The arithmetic average of the three fracture toughness value $K_{ISSC}$ (MPa√m) was determined, and defined as the fracture toughness value $K_{ISSC}$ (MPa√m) of the sample material of the relevant test number.

$$K_{ISSC} = \frac{Pa\left(2\sqrt{3} + 2.38\frac{h}{a}\right)\left(\frac{B}{Bn}\right)^{\frac{1}{3}}}{Bh^{\frac{3}{2}}} \tag{8}$$

In Formula (8), h (mm) represents the height of each arm of the DCB test specimen, B (mm) represents the thickness of the DCB test specimen, and Bn (mm) represents the web thickness of the DCB test specimen. These are defined in "Method D" of NACE TM0177-2005.

For the sample material of each test number, the obtained fracture toughness values $K_{ISSC}$ are shown in Table 2. If the fracture toughness value $K_{ISSC}$ that was defined as described above was 42.0 MPa√m or more, it was determined that the SSC resistance was good. Note that, the clearance between the anus when the wedge is driven in prior to immersion in the test bath influences the Kiss value. Accordingly, actual measurement of the clearance between the arms was performed in advance using a micrometer, and it was also confirmed that the clearance was within the range in the API standards.

[Low Temperature SSC Resistance Test]

With respect to the sample materials of each test number, a low temperature SSC resistance test was conducted in accordance with "Method A" of NACE TM0177-2005, and the SSC resistance was evaluated. Specifically, three of the round bar test specimens each of which was 6.35 mm in the diameter of a parallel portion and 25.4 mm in the length of the parallel portion, were taken from a center portion of the thickness of the sample material of each test number. The axial direction of the round bar test specimen was parallel with the rolling direction of the sample material (the axial direction of the seamless steel pipe). Tensile stress was applied in the axial direction of the round bar test specimens of each test number. At this time, the applied stress was adjusted so as to be 95% of the actual yield stress of each sample material in accordance with "Method A" of NACE TM0177-2005.

A mixed aqueous solution containing 5.0 mass % of sodium chloride and 0.5 mass % of acetic acid (NACE solution A) was used as the test solution. The test solution at 4° C. was poured into three test vessels, and these were adopted as test baths. The three round bar test specimens to which the stress was applied were immersed individually in mutually different test vessels as the test baths. After each test bath was degassed, 1 atm $H_2S$ gas was blown into the respective test baths and caused to saturate. The test baths in which the 1 atm $H_2S$ gas was saturated were held at 4° C. for 720 hours.

After immersion for 720 hours, the round bar test specimens of each test number were observed to determine whether or not sulfide stress cracking (SSC) had occurred. Specifically, after immersion for 720 hours, the round bar test specimens were observed with the naked eye. Sample materials for which cracking was not confirmed in all three of the test specimens as the result of the observation were determined as being "E" (Excellent). On the other hand, sample materials for which cracking was confirmed in at least one test specimen were determined as being "NA" (Not Acceptable).

[Test Results]

The test results are shown in Table 2.

Referring to Table 1 and Table 2, the chemical compositions of the sample materials of Test Numbers 1-1 to 1-18 were appropriate, the yield strength was in the range of 655 to less than 758 MPa (95 ksi grade), and the yield ratio was 85% or more. In addition, the amount of dissolved C was in the range of 0.010 to 0.050 mass %. As a result, the $K_{ISSC}$ value was 42.0 MPa√m or more. Further, the cracking was not confirmed in all three of the test specimens in the low temperature SSC resistance test. In other words, excellent SSC resistance was exhibited. Note that, the dislocation density of the sample materials of Test Numbers 1-1 to 1-18 were within the range of $1.0 \times 10^{14}$ to less than $4.4 \times 10^{14}$ m$^{-2}$.

On the other hand, for the sample materials of Test Numbers 1-19 to 1-25, the cooling rate after tempering ($CR_{600-200}$) was too slow. Consequently, the amount of dissolved C was less than 0.010 mass %. As a result, the fracture toughness value $K_{ISSC}$ was less than 42.0 MPa√m and the cracking was confirmed in the low temperature SSC resistance test. In other words, excellent SSC resistance was not exhibited. Note that, the dislocation density of the sample materials of Test Numbers 1-19 to 1-25 were within the range of $10 \times 10^{14}$ to less than $4.4 \times 10^{14}$ m$^{-2}$.

For the sample material of Test Number 1-26, the cooling rate after tempering ($CR_{600-200}$) was too fast. Consequently, the amount of dissolved C was more than 0.050 mass %. As a result, the fracture toughness value $K_{ISSC}$ was less than 42.0 MPa√m and the cracking was confirmed in the low temperature SSC resistance test. In other words, excellent SSC resistance was not exhibited. Note that, the dislocation density of the sample material of Test Number 1-26 was within the range of $1.0 \times 10^{14}$ to less than $4.4 \times 10^4$ m$^{-2}$.

For the sample material of Test Number 1-27, the Mo content was too low. As a result, the yield ratio was less than 85%. As a result, the fracture toughness value $K_{ISSC}$ was less than 42.0 MPa m and the cracking was confirmed in the low temperature SSC resistance test. In other words, excellent SSC resistance was not exhibited. Note that, the dislocation density of the sample material of Test Number 1-26 was $4.4 \times 10^{14}$ m$^{-2}$ or more.

Example 2

In Example 2, the SSC resistance of a steel material having a yield strength of 110 ksi guide (758 to less than 862 MPa) was investigated. Specifically, molten steels having the chemical compositions shown in Table 4 were produced.

TABLE 4

| Test Number | Chemical Composition (Unit is mass %; balance is Fe and impurities) | | | | | | | | | | | |
| --- | --- | --- | --- | --- | --- | --- | --- | --- | --- | --- | --- | --- |
| | C | Si | Mn | P | S | Al | Cr | Mo | Ti | N | O | B |
| 2-A | 0.27 | 0.28 | 0.49 | 0.008 | 0.0019 | 0.027 | 1.04 | 0.71 | 0.020 | 0.0029 | 0.0010 | 0.0012 |
| 2-B | 0.27 | 0.30 | 0.42 | 0.007 | 0.0011 | 0.035 | 1.02 | 0.70 | 0.006 | 0.0025 | 0.0010 | 0.0013 |
| 2-C | 0.27 | 0.30 | 0.42 | 0.007 | 0.0011 | 0.040 | 0.55 | 1.25 | 0.006 | 0.0025 | 0.0010 | 0.0013 |
| 2-D | 0.27 | 0.30 | 0.42 | 0.007 | 0.0011 | 0.040 | 3.03 | 0.65 | 0.006 | 0.0020 | 0.0010 | 0.0013 |
| 2-E | 0.27 | 0.29 | 0.41 | 0.007 | 0.0010 | 0.035 | 0.96 | 1.34 | 0.006 | 0.0025 | 0.0010 | 0.0012 |
| 2-F | 0.28 | 0.29 | 0.45 | 0.007 | 0.0010 | 0.035 | 0.51 | 1.06 | 0.004 | 0.0025 | 0.0010 | 0.0012 |
| 2-G | 0.28 | 0.27 | 0.47 | 0.007 | 0.0010 | 0.035 | 0.50 | 1.26 | 0.004 | 0.0025 | 0.0010 | 0.0012 |
| 2-H | 0.25 | 0.34 | 0.35 | 0.007 | 0.0010 | 0.035 | 0.77 | 0.89 | 0.004 | 0.0025 | 0.0010 | 0.0012 |
| 2-I | 0.26 | 0.33 | 0.30 | 0.007 | 0.0010 | 0.035 | 1.13 | 0.79 | 0.004 | 0.0025 | 0.0010 | 0.0010 |
| 2-J | 0.29 | 0.25 | 0.37 | 0.007 | 0.0010 | 0.035 | 1.15 | 0.87 | 0.004 | 0.0025 | 0.0010 | 0.0010 |
| 2-K | 0.27 | 0.32 | 0.36 | 0.007 | 0.0010 | 0.035 | 1.12 | 1.22 | 0.004 | 0.0025 | 0.0010 | 0.0010 |

TABLE 4-continued

| | | | | | | | | | | | |
|---|---|---|---|---|---|---|---|---|---|---|---|
| 2-L | 0.27 | 0.31 | 0.43 | 0.007 | 0.0010 | 0.035 | 0.55 | 1.22 | 0.004 | 0.0025 | 0.0010 | 0.0010 |
| 2-M | 0.27 | 0.33 | 0.36 | 0.007 | 0.0010 | 0.035 | 0.62 | 1.23 | 0.004 | 0.0025 | 0.0010 | 0.0030 |
| 2-N | 0.27 | 0.31 | 0.34 | 0.007 | 0.0010 | 0.035 | 0.48 | 0.68 | 0.004 | 0.0025 | 0.0010 | 0.0010 |
| 2-O | 0.27 | 0.28 | 0.48 | 0.007 | 0.0010 | 0.035 | 0.75 | 0.20 | 0.004 | 0.0025 | 0.0010 | 0.0010 |

| Test Number | Chemical Composition (Unit is mass %; balance is Fe and impurities) | | | | | | | | | |
|---|---|---|---|---|---|---|---|---|---|---|
| | V | Nb | Ca | Mg | REM | Zr | Co | W | Cu | Ni |
| 2-A | — | 0.028 | — | — | — | — | — | — | — | — |
| 2-B | 0.10 | 0.030 | — | — | — | — | — | — | — | — |
| 2-C | 0.10 | 0.030 | 0.0012 | — | — | — | — | — | 0.02 | — |
| 2-D | 0.10 | 0.030 | — | — | — | — | 0.10 | 0.10 | — | — |
| 2-E | 0.10 | 0.025 | — | — | — | — | — | — | — | — |
| 2-F | 0.10 | 0.028 | — | — | — | — | — | — | 0.03 | — |
| 2-G | 0.10 | 0.028 | — | — | — | — | — | — | — | 0.03 |
| 2-H | 0.10 | 0.028 | 0.0012 | — | — | — | — | — | — | — |
| 2-I | 0.10 | 0.025 | — | 0.0015 | — | — | — | — | — | — |
| 2-J | 0.10 | 0.025 | — | — | 0.0012 | — | — | — | — | — |
| 2-K | 0.10 | 0.025 | — | — | — | 0.0013 | — | — | — | — |
| 2-L | 0.10 | 0.025 | — | — | — | — | 0.10 | — | — | — |
| 2-M | 0.30 | 0.025 | — | — | — | — | — | 0.10 | — | — |
| 2-N | 0.10 | 0.025 | 0.0012 | — | — | — | 0.10 | — | — | — |
| 2-O | — | 0.025 | — | — | — | — | — | — | — | — |

A billet having an outer diameter of 310 mm was produced using the aforementioned molten steel. The produced billet was heated to 1250° C., and then the billet was hot rolled to produce a seamless steel pipe having an outer diameter of 244.48 mm and a wall thickness of 13.84 mm. A sample material having a thickness of 13.84 mm in a plate shape was taken from the produced seamless steel pipe such that the sample material has a size enough for taking out specimens for use in evaluation tests, which will be described later.

The obtained the sample material of each test number was subjected to quenching and tempering. Specifically, the quenching and tempering were repeated twice on the sample materials of each test number. In more specific terms, the sample materials of each test number were held at a quenching temperature of 920° C. for 10 minutes. After being held, the sample materials of each test number were immersed in a water bath for water cooling. At this time, the cooling rate during first quenching ($CR_{800-500}$) was 300° C./min. The quenching temperature was set to the temperature of the furnace that performed the heating of quenching. The cooling rate during quenching ($CR_{800-500}$) was determined from the temperature that was measured by a type K thermocouple of a sheath type being inserted into a center portion of the sample material in advance.

After first quenching, the sample materials of each test number were subjected to first tempering. For the first tempering, the sample materials of each test number were held at a tempering temperature of 700° C. for 30 minutes of tempering time, and were allowed to cool to a normal temperature. Here, the temperature of the furnace that performed the tempering was also used for the tempering temperature.

After performing the first quenching and tempering, the sample materials of each test number were subjected to the second quenching. Specifically, the sample materials of each test number were held at a quenching temperature of 900° C. for 30 minutes. The sample materials of each test number after being held were immersed in a water bath for water cooling. At this time, the cooling rate during second quenching ($CR_{800-500}$) was 300° C./min.

After performing the second quenching the sample materials of each test number were subjected to the second tempering. As with the case of the sample materials of each test number, the tempering temperature was adjusted such that the yield strength of 110 ksi grade (758 to less than 862 MPa) was achieved. Specifically, in the second tempering performed on the sample materials of each test number, the tempering temperature (° C.) and the tempering time (min) were as shown in Table 5.

After being subjected to the tempering, the sample materials of each test number were cooled. For the cooling, the sample materials of each test number were subjected to a controlled cooling by mist water cooling. The cooling rate after tempering ($CR_{600-200}$)(° C./sec) of the sample materials of each test number was as shown in Table 5. Note that, the cooling rates after first and second tempering ($CR_{600-200}$) were determined from the temperature that was measured by a type K thermocouple of a sheath type being inserted into a center portion of the sample material in advance.

TABLE 5

| Test Number | Steel | Tempering Temperature (° C.) | Tempering Time (min) | $CR_{600-200}$ (° C./sec) | YS (MPa) | TS (MPa) | YR (%) | Dissolved C Amount (mass %) | Dislocation Density ($\times 10^{14} \times m^{-2}$) | $K_{1SSC}$ (MPa√m) | | | Average Value |
|---|---|---|---|---|---|---|---|---|---|---|---|---|---|
| | | | | | | | | | | 1 | 2 | 3 | |
| 2-1 | 2-A | 670 | 30 | 19.3 | 817 | 897 | 91 | 0.024 | 6.0 | 32.3 | 29.7 | 29.5 | 30.5 |
| 2-2 | 2-A | 675 | 30 | 19.7 | 816 | 899 | 91 | 0.027 | 5.9 | 29.0 | 29.7 | 29.5 | 29.4 |
| 2-3 | 2-A | 680 | 30 | 20.0 | 798 | 883 | 90 | 0.037 | 5.0 | 34.1 | 32.2 | 32.2 | 32.8 |
| 2-4 | 2-B | 700 | 30 | 20.5 | 800 | 876 | 91 | 0.037 | 5.2 | 34.1 | 36.8 | 39.7 | 36.9 |
| 2-5 | 2-B | 710 | 30 | 19.4 | 779 | 855 | 91 | 0.029 | 4.6 | 34.3 | 35.1 | 35.2 | 34.9 |
| 2-6 | 2-C | 700 | 30 | 21.0 | 807 | 876 | 92 | 0.032 | 5.2 | 34.4 | 34.6 | 37.4 | 35.5 |

TABLE 5-continued

| Test Number | Steel | Tempering Temperature (° C.) | Tempering Time (min) | $CR_{600-200}$ (° C./sec) | YS (MPa) | TS (MPa) | YR (%) | Dissolved C Amount (mass %) | Dislocation Density ($\times 10^{14} \times m^{-2}$) | $K_{ISSC}$ (MPa√m) 1 | 2 | 3 | Average Value |
|---|---|---|---|---|---|---|---|---|---|---|---|---|---|
| 2-7 | 2-C | 710 | 30 | 22.5 | 772 | 855 | 90 | 0.047 | 4.5 | 37.4 | 39.6 | 36.3 | 37.8 |
| 2-8 | 2-D | 700 | 30 | 21.4 | 807 | 876 | 92 | 0.047 | 5.4 | 34.5 | 35.1 | 36.8 | 35.5 |
| 2-9 | 2-D | 710 | 30 | 19.3 | 786 | 855 | 92 | 0.050 | 5.1 | 39.7 | 38.9 | 34.7 | 37.8 |
| 2-10 | 2-E | 710 | 30 | 32.8 | 774 | 835 | 93 | 0.022 | 4.8 | 34.8 | 35.6 | 35.3 | 35.2 |
| 2-11 | 2-F | 710 | 30 | 43.9 | 773 | 850 | 91 | 0.031 | 4.6 | 35.5 | 35.5 | 36.3 | 35.8 |
| 2-12 | 2-G | 710 | 30 | 36.6 | 780 | 846 | 92 | 0.033 | 4.8 | 35.1 | 36.5 | 34.7 | 35.4 |
| 2-13 | 2-H | 710 | 30 | 38.6 | 772 | 855 | 90 | 0.012 | 4.6 | 343 | 34.4 | 36.1 | 34.9 |
| 2-14 | 2-I | 710 | 30 | 39.6 | 780 | 856 | 91 | 0.025 | 4.7 | 35.7 | 34.5 | 35.2 | 35.1 |
| 2-15 | 2-J | 710 | 30 | 35.2 | 762 | 843 | 90 | 0.048 | 4.5 | 35.2 | 36.0 | 36.0 | 35.7 |
| 2-16 | 2-K | 710 | 30 | 38.4 | 775 | 850 | 91 | 0.016 | 4.7 | 34.2 | 35.8 | 36.7 | 35.6 |
| 2-17 | 2-L | 710 | 30 | 44.4 | 762 | 826 | 92 | 0.017 | 4.6 | 35.2 | 34.9 | 36.9 | 35.7 |
| 2-18 | 2-M | 710 | 30 | 43.5 | 760 | 841 | 90 | 0.016 | 4.4 | 35.4 | 35.3 | 34.1 | 34.9 |
| 2-19 | 2-N | 710 | 30 | 39.6 | 774 | 842 | 92 | 0.028 | 4.8 | 35.6 | 34.1 | 35.9 | 35.2 |
| 2-20 | 2-A | 670 | 30 | 0.4 | 813 | 899 | 90 | 0.005 | 5.6 | 23.2 | 26.6 | 29.1 | 26.3 |
| 2-21 | 2-A | 675 | 30 | 0.4 | 813 | 898 | 91 | 0.004 | 5.3 | 23.1 | 29.2 | 23.2 | 25.2 |
| 2-22 | 2-A | 680 | 30 | 0.4 | 800 | 889 | 90 | 0.003 | 5.0 | 23.3 | 27.9 | 29.1 | 26.8 |
| 2-23 | 2-B | 700 | 30 | 0.5 | 820 | 896 | 92 | 0.006 | 6.3 | 24.7 | 26.4 | 28.0 | 26.4 |
| 2-24 | 2-B | 710 | 30 | 0.3 | 786 | 862 | 91 | 0.004 | 4.7 | 24.7 | 29.1 | 28.0 | 27.3 |
| 2-25 | 2-C | 700 | 30 | 0.4 | 814 | 903 | 90 | 0.005 | 5.8 | 24.6 | 27.8 | 27.8 | 26.7 |
| 2-26 | 2-C | 710 | 30 | 0.4 | 779 | 862 | 90 | 0.004 | 4.7 | 24.7 | 29.2 | 25.6 | 26.5 |
| 2-27 | 2-D | 700 | 30 | 0.3 | 814 | 889 | 92 | 0.005 | 5.6 | 24.7 | 28.0 | 26.3 | 26.3 |
| 2-28 | 2-D | 710 | 30 | 0.4 | 793 | 862 | 92 | 0.005 | 5.3 | 26.6 | 26.5 | 26.4 | 26.5 |
| 2-29 | 2-A | 675 | 30 | 115.0 | 803 | 890 | 90 | 0.065 | 5.1 | 23.2 | 23.1 | 23.5 | 23.3 |
| 2-30 | 2-O | 675 | 30 | 31.7 | 760 | 844 | 90 | 0.036 | 4.6 | 26.5 | 26.4 | 26.3 | 26.4 |

Evaluation Results

A tensile test, microstructure determination test, amount of dissolved C measurement test, a dislocation density measurement test and DCB test described hereunder were performed on the sample materials of each test number after the aforementioned tempering.

[Tensile Test]

A tensile test was performed in accordance with ASTM E8 (2013). Round bar tensile test specimens having a diameter of 6.35 mm and a parallel portion length of 35 mm were taken from the center portion of the thickness of the sample materials of each test number. The axial direction of each of the round bar test specimens was parallel to the rolling direction of the sample material (the axial direction of the seamless steel pipe). A tensile test was performed in the atmosphere at normal temperature (25° C.) using each test number of round bar test specimens, and the yield strength (MPa) and tensile strength (MPa) were obtained. Note that, in the present example, the stress at the time of 0.7% elongation obtained in the tensile test defined as the yield strength for each test number. Further, the largest stress during uniform elongation was taken as the tensile strength. A ratio of the yield strength to the tensile strength (YS/TS) was adopted as the yield ratio (%). The determined yield strength (YS), tensile strength (TS) and yield ratio (YR) are shown in Table 5.

[Microstructure Determination Test]

With respect to the microstructures of the sample materials of each test number, when the yield strength was in a range of 758 to less than 862 MPa (110 ksi grade) and the yield ratio was 85% or more, it was determined that the volume ratios of tempered martensite and tempered bainite was 90% or more. In the microstructure of the sample materials of all of test numbers, the volume ratios of tempered martensite and tempered bainite was 90% or more.

[Amount of Dissolved C Measurement Test]

With respect to the sample materials of each test number, the amount of dissolved C (mass %) was measured and calculated by the measurement method described above. Note that, the TEM used was JEM-2010 manufactured by JEOL Ltd., the acceleration voltage was set to 200 kV. For the EDS point analysis the irradiation current was 2.56 nA, and measurement was performed for 60 seconds at each point. The observation regions for the TEM observation were 8 μm×8 μm, and observation was performed with respect to an arbitrary 10 visual fields. The residual amounts of each element and the concentrations of each element in cementite that were used to calculate the amount of dissolved C were as listed in Table 6.

TABLE 6

| Test Number | Steel | Residual Amount (mass %) | | | | | | Concentration In Cementite (mass %) | | | | Dissolved C Amount (mass %) |
|---|---|---|---|---|---|---|---|---|---|---|---|---|
| | | Fe | Cr | Mn | Mo | V | Nb | Fe | Cr | Mn | Mo | |
| 2-1 | 2-A | 2.6 | 0.48 | 0.09 | 0.22 | — | 0.025 | 81.3 | 10.9 | 2.5 | 5.2 | 0.024 |
| 2-2 | 2-A | 2.6 | 0.48 | 0.10 | 0.20 | — | 0.026 | 81.0 | 10.9 | 2.5 | 5.6 | 0.027 |
| 2-3 | 2-A | 2.3 | 0.52 | 0.10 | 0.26 | — | 0.022 | 83.3 | 8.6 | 2.6 | 5.5 | 0.037 |
| 2-4 | 2-B | 2.2 | 0.46 | 0.10 | 0.22 | 0.066 | 0.023 | 81.5 | 10.4 | 2.5 | 5.7 | 0.037 |
| 2-5 | 2-B | 2.2 | 0.43 | 0.13 | 0.27 | 0.063 | 0.024 | 84.0 | 8.6 | 2.7 | 4.6 | 0.029 |
| 2-6 | 2-C | 2.4 | 0.24 | 0.11 | 0.25 | 0.068 | 0.026 | 85.3 | 8.1 | 2.1 | 4.5 | 0.032 |
| 2-7 | 2-C | 2.3 | 0.21 | 0.10 | 0.22 | 0.071 | 0.017 | 85.0 | 7.3 | 2.6 | 5.1 | 0.047 |
| 2-8 | 2-D | 2.2 | 0.32 | 0.11 | 0.20 | 0.071 | 0.023 | 82.9 | 9.7 | 2.3 | 5.0 | 0.047 |

TABLE 6-continued

| Test Number | Steel | Residual Amount (mass %) | | | | | | Concentration In Cementite (mass %) | | | | Dissolved C Amount (mass %) |
|---|---|---|---|---|---|---|---|---|---|---|---|---|
| | | Fe | Cr | Mn | Mo | V | Nb | Fe | Cr | Mn | Mo | |
| 2-9 | 2-D | 2.1 | 0.32 | 0.11 | 0.25 | 0.068 | 0.025 | 82.0 | 9:4 | 2.5 | 6.1 | 0.050 |
| 2-10 | 2-E | 2.4 | 0.47 | 0.11 | 0.21 | 0.071 | 0.022 | 83.1 | 8.6 | 3.0 | 5.3 | 0.022 |
| 2-11 | 2-F | 2.4 | 0.45 | 0.12 | 0.21 | 0.070 | 0.021 | 85.2 | 7.6 | 2.5 | 4.7 | 0.031 |
| 2-12 | 2-G | 2.4 | 0.45 | 0.15 | 0.19 | 0.071 | 0.025 | 84.0 | 7.7 | 2.8 | 5.5 | 0.033 |
| 2-13 | 2-H | 2.4 | 0.47 | 0.11 | 0.12 | 0.071 | 0.021 | 84.8 | 7.7 | 2.7 | 4.8 | 0.012 |
| 2-14 | 2-I | 2.2 | 0.47 | 0.11 | 0.22 | 0.063 | 0.028 | 84.8 | 7.1 | 2.9 | 5.1 | 0.025 |
| 2-15 | 2-J | 2.3 | 0.45 | 0.11 | 0.23 | 0.072 | 0.021 | 84.3 | 7.3 | 2.9 | 5.5 | 0.048 |
| 2-16 | 2-K | 2.4 | 0.46 | 0.11 | 0.27 | 0.072 | 0.021 | 84.4 | 7.2 | 2.9 | 5.5 | 0.016 |
| 2-17 | 2-L | 2.5 | 0.44 | 0.11 | 0.23 | 0.063 | 0.021 | 83.9 | 7.7 | 2.9 | 5.5 | 0.017 |
| 2-18 | 2-M | 2.5 | 0.45 | 0.11 | 0.22 | 0.071 | 0.021 | 84.3 | 7.4 | 2.9 | 5.5 | 0.016 |
| 2-19 | 2-N | 2.1 | 0.45 | 0.11 | 0.35 | 0.065 | 0.021 | 84.0 | 7.5 | 2.9 | 5.5 | 0.028 |
| 2-20 | 2-A | 2.7 | 0.51 | 0.11 | 0.26 | — | 0.023 | 85.9 | 7.2 | 2.9 | 4.0 | 0.005 |
| 2-21 | 2-A | 2.7 | 0.52 | 0.11 | 0.26 | — | 0.024 | 83.4 | 9.7 | 2.8 | 4.0 | 0.004 |
| 2-22 | 2-A | 2.7 | 0.54 | 0.11 | 0.26 | — | 0.028 | 78.3 | 14.8 | 2.8 | 4.1 | 0.003 |
| 2-23 | 2-B | 2.5 | 0.55 | 0.11 | 0.23 | 0.061 | 0.024 | 83.5 | 9.7 | 2.4 | 4.4 | 0.006 |
| 2-24 | 2-B | 2.4 | 0.56 | 0.11 | 0.26 | 0.077 | 0.023 | 85.6 | 7.3 | 2.9 | 4.2 | 0.004 |
| 2-25 | 2-C | 2.6 | 0.38 | 0.10 | 0.26 | 0.070 | 0.025 | 83.5 | 9.6 | 3.0 | 3.9 | 0.005 |
| 2-26 | 2-C | 2.6 | 0.38 | 0.11 | 0.28 | 0.069 | 0.028 | 85.5 | 7.1 | 2.9 | 4.5 | 0.004 |
| 2-27 | 2-D | 2.5 | 0.55 | 0.11 | 0.23 | 0.061 | 0.024 | 83.3 | 10.2 | 2.4 | 4.0 | 0.005 |
| 2-28 | 2-D | 2.4 | 0.56 | 0.11 | 0.26 | 0.077 | 0.023 | 85.4 | 7.2 | 2.9 | 4.5 | 0.005 |
| 2-29 | 2-A | 2.1 | 0.46 | 0.10 | 0.19 | — | 0.025 | 80.3 | 10.1 | 3.3 | 6.3 | 0.065 |
| 2-30 | 2-O | 2.3 | 0.47 | 0.12 | 0.29 | — | 0.021 | 81.9 | 9.6 | 2.6 | 5.9 | 0.036 |

[Dislocation Density Measurement Test]

Test specimens for use for dislocation density measurement by the aforementioned method were taken from the sample material of each test number. In addition, the dislocation density ($m^{-2}$) was determined by the aforementioned method. The determined dislocation density ($\times 10^{14} \times m^{-2}$) is shown in Table 5.

[DCB Test]

With respect to the sample materials of each test number, a DCB test was conducted in accordance with "Method D" of NACE TM0177-2005, and the SSC resistance was evaluated. Specifically, the DCB test was performed in a similar manner to Example 1 except that the thickness t of the wedge described in FIG. 2B was made 2.92 (mm). The arithmetic average of the three fracture toughness value $K_{ISSC}$ (MPa√m) was determined, and defined as the fracture toughness value $K_{ISSC}$ (MPa√m) of the sample material of the relevant test number.

For the sample material of each test number, the obtained fracture toughness values $K_{ISSC}$ are shown in Table 5. If the fracture toughness value $K_{ISSC}$ that was defined as described above was 27.5 MPa√m or more, it was determined that the SSC resistance was good. Note that, the clearance between the arms when the wedge is driven in prior to immersion in the test bath influences the $K_{ISSC}$ value. Accordingly, actual measurement of the clearance between the arms was performed in advance using a micrometer, and it was also confined that the clearance was within the range in the API standards.

[Test Results]

The test results are shown in Table 5.

Referring to Table 4 and Table 5, the chemical compositions of the sample materials of Test Numbers 2-1 to 2-19 were appropriate, the yield strength was in the range of 758 to less than 862 MPa (110 ksi grade), and the yield ratio was 85% or more. In addition, the amount of dissolved C was in the range of 0.010 to 0.050 mass %. As a result, the $K_{ISSC}$ value was 27.5 MPa√m or more and excellent SSC resistance was exhibited. Note that, the dislocation density of the sample materials of Test Numbers 2-1 to 2-19 were within the range of $4.4 \times 10^{14}$ to less than $6.5 \times 10^{14}$ $m^{-2}$.

On the other hand, for the sample materials of Test Numbers 2-20 to 2-28, the cooling rate after tempering ($CR_{600-200}$) was too slow. Consequently, the amount of dissolved C was less than 0.010 mass %. As a result, the fracture toughness value $K_{ISSC}$ was less than 27.5 MPa√m and excellent SSC resistance was not exhibited. Note that, the dislocation density of the sample materials of Test Numbers 2-20 to 2-28 were within the range of $4.4 \times 10^{14}$ to less than $6.5 \times 10^{14}$ $m^{-2}$.

For the sample material of Test Number 2-29, the cooling rate after tempering ($CR_{600-200}$) was too fast. Consequently, the amount of dissolved C was more than 0.050 masse. As a result, the fracture toughness value $K_{ISSC}$ was less than 27.5 MPa√m and excellent SSC resistance was not exhibited. Note that, the dislocation density of the sample material of Test Number 2-29 was within the range of $4.4 \times 10^{14}$ to less than $6.5 \times 10^{14}$ $m^{-2}$.

For the sample material of Test Number 2-30, the Mo content was too low. As a result, the fracture toughness value $K_{ISSC}$ was less than 27.5 MPa√m and excellent SSC resistance was not exhibited. Note that, the dislocation density of the sample material of Test Number 2-30 was within the range of $4.4 \times 10^{14}$ to less than $6.5 \times 10^{14}$ $m^{-2}$.

An embodiment of the present invention has been described above. However, the embodiment described above is merely an example for implementing the present invention. Accordingly, the present invention is not limited to the above embodiment, and the above embodiment can be appropriately modified and performed within a range that does not deviate from the gist of the present invention.

INDUSTRIAL APPLICABILITY

The steel material according to the present invention is widely applicable to steel materials to be utilized in a sour environment, and preferably can be utilized as a steel material for oil wells that is utilized in an oil well environment, and further preferably can be utilized as oil-well steel pipes, such as casing, tubing and line pipes.

The invention claimed is:
1. A steel material having
a chemical composition consisting of, in mass %,
C: 0.20 to 0.50%,
Si: 0.05 to 0.50%,
Mn: 0.05 to 1.00%,
P: 0.030% or less,
S: 0.0100% or less,
Al: 0.005 to 0.100%,
Cr: 0.10 to 1.50%,
Mo: 0.25 to 1.50%,
Ti: 0.002 to 0.050%,
N: 0.0100% or less,
O: 0.0100% or less,
B: 0 to 0.0050%,
V: 0 to 0.30%,
Nb: 0 to 0.100%,
Ca: 0 to 0.0100%,
Mg: 0 to 0.0100%,
Zr: 0 to 0.0100%,
rare earth metal: 0 to 0.0100%,
Co: 0 to 0.45%,
W: 0 to 0.50%,
Ni: 0 to 0.50%,
Cu: 0 to 0.50%, and
with the balance being Fe and impurities,
an amount of dissolved C within a range of 0.010 to 0.050 mass %,
a yield strength within a range of 655 to less than 862 MPa, and
a yield ratio of 85% or more.

2. The steel material according to claim 1, wherein the chemical composition contains:
B: 0.0001 to 0.0050%.

3. The steel material according to claim 1, wherein the chemical composition contains one or more types of elements selected from the group consisting of:
V: 0.01 to 0.30%, and
Nb: 0.002 to 0.100%.

4. The steel material according to claim 1, wherein the chemical composition contains one or more types of elements selected from the group consisting of:
Ca: 0.0001 to 0.0100%,
Mg: 0.0001 to 0.0100%,
Zr: 0.0001 to 0.0100%, and
rare earth metal: 0.0001 to 0.0100%.

5. The steel material according to claim 1, wherein the chemical composition contains one or more types of elements selected from the group consisting of:
Co: 0.02 to 0.45%, and
W: 0.02 to 0.50%.

6. The steel material according to claim 1, wherein the chemical composition contains one or more types of elements selected from the group consisting of:
Ni: 0.02 to 0.50%, and
Cu: 0.02 to 0.50%.

7. The steel material according to claim 1, wherein the yield strength is within the range of 655 to less than 758 MPa.

8. The steel material according to claim 1, wherein the yield strength is within the range of 758 to less than 862 MPa.

9. The steel material according to claim 1, wherein the steel material is an oil-well steel pipe.

10. The steel material according to claim 1, wherein the steel material is a seamless steel pipe.

* * * * *